(12) United States Patent
Zinck et al.

(10) Patent No.: US 11,710,849 B2
(45) Date of Patent: Jul. 25, 2023

(54) SO$_2$-BASED ELECTROLYTE FOR A RECHARGEABLE BATTERY CELL, AND RECHARGEABLE BATTERY CELLS

(71) Applicant: Innolith Technology AG, Basel (CH)

(72) Inventors: Laurent Zinck, Mothern (FR); Christian Pszolla, Karlsruhe (DE); Rebecca Busch, Bruchsal (DE)

(73) Assignee: Innolith Technology AG, Basel (CH)

( * ) Notice: Subject to any disclaimer, the term of this patent is extended or adjusted under 35 U.S.C. 154(b) by 450 days.

(21) Appl. No.: 16/897,440

(22) Filed: Jun. 10, 2020

(65) Prior Publication Data
US 2021/0036358 A1 Feb. 4, 2021

(30) Foreign Application Priority Data

Jul. 31, 2019 (EP) ..................................... 19189435

(51) Int. Cl.
H01M 10/00 (2006.01)
H01M 10/056 (2010.01)
(Continued)

(52) U.S. Cl.
CPC ........ H01M 10/056 (2013.01); C01G 49/009 (2013.01); C01G 51/42 (2013.01);
(Continued)

(58) Field of Classification Search
CPC .. H01M 4/38; H01M 10/052; H01M 10/0568; H01M 10/0567; H01M 10/0569
See application file for complete search history.

(56) References Cited

U.S. PATENT DOCUMENTS 4,891,281 A 1/1990 Kuo et al.
6,730,441 B1 5/2004 Hambitzer et al.
(Continued)

FOREIGN PATENT DOCUMENTS

CN 101622738 A 1/2010
CN 102742049 A 10/2012
(Continued)

OTHER PUBLICATIONS

Rohde et al., Li[B(OCH2CF3)4]: Synthesis, Characterization and Electrochemical Application as a Conducting Salt for LiSB Batteries, ChemPhysChem, 2015, vol. 16, pp. 666-675.
(Continued)

*Primary Examiner* — Cynthia H Kelly
*Assistant Examiner* — Monique M Wills
(74) *Attorney, Agent, or Firm* — Bose McKinney & Evans LLP

(57) ABSTRACT

This disclosure relates to an SO$_2$-based electrolyte for a rechargeable battery cell containing at least one conducting salt of the Formula (I)

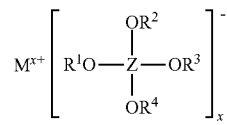

Formula (I)

wherein M is a metal selected from the group consisting of alkali metals, alkaline earth metals, metals of group 12 of the periodic table of the elements and aluminum; x is an integer from 1 to 3; the substituents R, $R^2$, $R^3$ and $R^4$ are each independently selected from the group consisting of $C_1$-$C_{10}$ (Continued)

alkyl, $C_2$-$C_1$ alkenyl, $C_2$-$C_1$ alkynyl, $C_3$-$C_{10}$ cycloalkyl, $C_6$-$C_{14}$ aryl, and $C_5$-$C_{14}$ heteroaryl; and Z is aluminum or boron.

58 Claims, 13 Drawing Sheets

(51) Int. Cl.

| | |
|---|---|
| C07F 5/04 | (2006.01) |
| C07F 5/06 | (2006.01) |
| H01M 4/505 | (2010.01) |
| H01M 4/525 | (2010.01) |
| H01M 10/0525 | (2010.01) |
| H01M 4/131 | (2010.01) |
| H01M 4/133 | (2010.01) |
| H01M 4/134 | (2010.01) |
| H01M 4/136 | (2010.01) |
| H01M 4/36 | (2006.01) |
| H01M 4/38 | (2006.01) |
| H01M 4/48 | (2010.01) |
| H01M 4/485 | (2010.01) |
| H01M 4/58 | (2010.01) |
| H01M 4/587 | (2010.01) |
| H01M 4/62 | (2006.01) |
| H01M 4/66 | (2006.01) |
| H01M 4/80 | (2006.01) |
| H01M 10/0563 | (2010.01) |
| H01M 4/583 | (2010.01) |
| H01M 10/0562 | (2010.01) |
| C01G 49/00 | (2006.01) |
| C01G 51/00 | (2006.01) |
| C01G 53/00 | (2006.01) |
| H01M 4/74 | (2006.01) |
| H01M 10/054 | (2010.01) |
| H01M 4/02 | (2006.01) |

(52) U.S. Cl.
CPC ............ *C01G 53/50* (2013.01); *C01G 53/54* (2013.01); *C07F 5/04* (2013.01); *C07F 5/069* (2013.01); *H01M 4/131* (2013.01); *H01M 4/133* (2013.01); *H01M 4/134* (2013.01); *H01M 4/136* (2013.01); *H01M 4/364* (2013.01); *H01M 4/382* (2013.01); *H01M 4/386* (2013.01); *H01M 4/483* (2013.01); *H01M 4/485* (2013.01); *H01M 4/505* (2013.01); *H01M 4/525* (2013.01); *H01M 4/583* (2013.01); *H01M 4/5805* (2013.01); *H01M 4/587* (2013.01); *H01M 4/5825* (2013.01); *H01M 4/623* (2013.01); *H01M 4/661* (2013.01); *H01M 4/745* (2013.01); *H01M 4/808* (2013.01); *H01M 10/054* (2013.01); *H01M 10/0525* (2013.01); *H01M 10/0562* (2013.01); *H01M 10/0563* (2013.01); *H01M 2004/027* (2013.01); *H01M 2004/028* (2013.01); *H01M 2300/002* (2013.01); *H01M 2300/0071* (2013.01)

(56) References Cited

U.S. PATENT DOCUMENTS

| | | | |
|---|---|---|---|
| 9,263,745 | B2 | 2/2016 | Zinck et al. |
| 2002/0015884 | A1 | 2/2002 | Schmidt et al. |
| 2003/0157409 | A1 | 8/2003 | Huang |
| 2005/0106467 | A1 | 5/2005 | Hambitzer et al. |
| 2006/0068293 | A1 | 3/2006 | Kim et al. |
| 2007/0065714 | A1 | 3/2007 | Hambitzer et al. |
| 2010/0062341 | A1 | 3/2010 | Hambitzer |
| 2011/0287304 | A1 | 11/2011 | Zinck et al. |
| 2013/0040188 | A1 | 2/2013 | Zinck et al. |
| 2014/0220428 | A1 | 8/2014 | Zinck et al. |
| 2015/0093632 | A1 | 4/2015 | Pszolla et al. |
| 2017/0047612 | A1* | 2/2017 | Zinck ............... H01M 10/0525 |
| 2017/0117547 | A1 | 4/2017 | Fanous et al. |
| 2017/0288211 | A1 | 10/2017 | Zhamu et al. |
| 2018/0254516 | A1 | 9/2018 | Han et al. |
| 2018/0277845 | A1 | 9/2018 | Yamaya et al. |
| 2019/0207262 | A1 | 7/2019 | Delobel |
| 2019/0260074 | A1 | 8/2019 | Hambitzer |

FOREIGN PATENT DOCUMENTS

| | | | | |
|---|---|---|---|---|
| CN | 102742062 | A | 10/2012 | |
| CN | 105723546 | A | 6/2016 | |
| CN | 108352515 | A | 7/2018 | |
| CN | 108630909 | A | 10/2018 | |
| CN | 109417192 | A | 3/2019 | |
| EP | 1 201 004 | B1 | 12/2004 | |
| EP | 2 360 772 | A1 | 8/2011 | |
| EP | 2 827 430 | A1 | 1/2015 | |
| EP | 2827430 | A1 * | 1/2015 | .......... H01M 10/052 |
| EP | 2 999 037 | A1 | 3/2016 | |
| EP | 2 534 719 | B1 | 1/2017 | |
| EP | 2 954 588 | B1 | 4/2017 | |
| JP | 2001-143750 | A | 5/2001 | |
| JP | 2001-210332 | A | 8/2001 | |
| JP | 2002-305026 | A | 10/2002 | |
| JP | 2003-157896 | A | 5/2003 | |
| JP | 2008-277001 | A | 11/2008 | |
| JP | 4306858 | B2 | 8/2009 | |
| JP | 2013-519967 | A | 5/2013 | |
| JP | 5901539 | B2 | 4/2016 | |
| KR | 10-2015-0115788 | A | 10/2015 | |
| KR | 10-2018-0013512 | A | 2/2018 | |
| KR | 10-2018-0114256 | A | 10/2018 | |
| KR | 10-2019-0003940 | A | 1/2019 | |
| RU | 2248071 | C2 | 3/2005 | |
| RU | 2 272 043 | C2 | 3/2006 | |
| RU | 2 325 014 | C1 | 5/2008 | |
| RU | 2 343 601 | C2 | 1/2009 | |
| WO | WO 00/79631 | A1 | 12/2000 | |
| WO | WO 02/00773 | A2 | 1/2002 | |
| WO | WO 2008/147751 | A1 | 12/2008 | |
| WO | WO 2012/042005 | A1 | 4/2012 | |
| WO | WO-2015007586 | A1 * | 1/2015 | ............. C07F 5/022 |
| WO | WO 2015/074006 | A1 | 5/2015 | |
| WO | WO 2017/178543 | A1 | 10/2017 | |
| WO | WO 2018/115024 | A1 | 6/2018 | |

OTHER PUBLICATIONS

Park et al., Performances of Li/LixCoO2 cells in LiAlCl4 • 3SO2 electrolyte, Journal of Power Sources, 1997, vol. 68, pp. 338-343.

Dreher et al., Rechargeable LiCoO2 in inorganic electrolyte solution, Journal of Power Sources, 1993, Vo. 44, pp. 583-587.

Gao et al., LiAlCl4-3SO2: a promising inorganic electrolyte for stable Li metal anode at room and low temperature, Ionics, 2019, vol. 25, pp. 4137-4147.

* cited by examiner

SO$_2$-BASED ELECTROLYTE FOR A RECHARGEABLE BATTERY CELL, AND RECHARGEABLE BATTERY CELLS

RELATED APPLICATIONS

This application claims priority to EP 19 189 435.1, filed Jul. 31, 2019, the entire disclosure of which is hereby incorporated herein by reference.

BACKGROUND

This disclosure relates to SO$_2$-based electrolytes for a rechargeable battery cell, and rechargeable battery cells comprising such electrolytes.

Rechargeable battery cells are of great importance in many technical fields. They are often used for applications that require only small cells with relatively low current intensities, for example for the operation of cell phones. However, there is also a need for larger rechargeable battery cells for high-energy applications, with mass storage of energy in the form of battery cells being of importance for many applications such as for electric automobiles and other electric vehicles.

High energy density is an important requirement for the high-energy types of rechargeable battery cells. This means that the rechargeable battery cell should contain as much electrical energy as possible per unit weight and volume. Lithium as an active metal has proven to be particularly advantageous for this purpose. The active metal of a rechargeable battery cell is the metal whose ions within the electrolyte migrate to the negative or positive electrode during cell charging or discharging. This is where they participate in electrochemical processes, which lead directly or indirectly to the release of electrons into the external circuit or to the absorption of electrons from the external circuit. Rechargeable battery cells containing lithium as an active metal are also referred to as lithium ion cells. The energy density of these lithium ion cells can be increased, e.g., either by expanding the specific capacitance of the electrodes or by increasing the cell voltage.

Both the positive and negative electrodes of lithium ion cells are designed as insertion electrodes.

The term "insertion electrode" in the sense of this disclosure refers to electrodes which have a crystalline structure that ions of the active material can be stored in and removed from during operation of the lithium ion cell. This means that the electrode processes can take place not only on the surface of the electrodes, but also within the crystalline structure. The negative electrode of lithium ion cells commonly has a carbon coating, which is applied to a conducting element made of copper. The conducting element provides the electronically conductive connection required between the carbon coating and the external circuit. The positive electrode is commonly made of lithium cobalt oxide (LiCoO$_2$), which is applied to a conducting element made of aluminum. Both electrodes typically have a thickness of less than 100 μm and are therefore very thin. When charging the lithium ion cell, the ions of the active metal are removed from the positive electrode and stored in the negative electrode. The reverse process takes place when the lithium ion cell is discharged.

The electrolyte is an important functional element of any rechargeable battery cell. It usually contains a solvent or blend of solvents and at least one conducting salt. Solid electrolytes or ionic liquids, for example, contain no solvent. They contain a conducting salt only. The electrolyte is in contact with the positive and negative electrodes of the battery cell. At least one ion of the conducting salt (anion or cation) is so mobile in the electrolyte that a charge transport between the electrodes, required for the functioning of the rechargeable battery cell, can take place through ionic conduction.

The electrolyte is oxidatively electrochemically decomposed at a certain upper cell voltage of the rechargeable battery cell. This process often leads to an irreversible destruction of the electrolyte components, and thus to a failure of the rechargeable battery cell. Reductive processes can also decompose the electrolyte when falling below a certain cell voltage. In order to avoid these processes, the positive and negative electrodes are selected in a way that ensures that the cell voltage is below or above the decomposition voltage of the electrolyte. The electrolyte thus determines the voltage window, i.e., the range within which the rechargeable battery cell can be operated reversibly.

State-of-the-art lithium ion cells that are used in many applications contain an electrolyte consisting of an organic solvent or solvent blend and a conducting salt dissolved therein. The conducting salt is a lithium salt such as lithium hexafluorophosphate (LiPF$_6$). The solvent blend can, for example, contain ethylene carbonate. Due to the organic solvent or solvent blend, these kinds of lithium ion cells are also referred to as organic lithium ion cells. It has long been known that unintentional overcharging of organic lithium ion cells leads to the irreversible decomposition of electrolyte components. The oxidative decomposition of the organic solvent and/or the conducting salt takes place on the surface of the positive electrode. The reaction heat generated during the decomposition and the resulting gaseous products lead to the subsequent "thermal runaway" and the resulting destruction of the organic lithium ion cell. Most charging protocols for these organic lithium-ion cells use cell voltage as an indicator of the end of charging. Accidents caused by a thermal runaway are particularly likely to occur when using multi-cell battery packs consisting of multiple organic lithium-ion cells with dissimilar capacities that are connected in series.

Therefore, organic lithium ion cells can be problematic in terms of their stability and long-term operational reliability. Safety risks are also caused by the flammability of the organic solvent or solvent blend. When an organic lithium ion cell catches fire or even explodes, the organic solvent of the electrolyte becomes a combustible material. Additional measures must be taken in order to avoid these safety risks. These measures include a very precise regulation of the charging and discharging processes of the organic lithium ion cell as well as an optimized battery design. Furthermore, the organic lithium-ion cell contains components that may melt due to an unintentional increase in temperature so that the organic lithium ion cell is flooded with molten plastic. A further uncontrolled increase in temperature is thus prevented. However, these measures lead to higher manufacturing costs when producing organic lithium ion cells as well as to increased volume and weight. They also reduce the energy density of the organic lithium ion cell.

A further disadvantage of organic lithium ion cells is that any hydrolysis products produced due to residual amounts of water are very aggressive towards the cell components of the rechargeable battery cell. For example, the conducting salt LiPF$_6$, which is frequently used in organic cells, reacts with traces of water and produces highly reactive, aggressive hydrogen fluoride (HF). To produce these types of rechargeable battery cells with an organic electrolyte, it is therefore important to ensure that the amount of residual water contained in the electrolyte and the cell components is minimized. For example, such battery cells may therefore be produced in costly drying rooms under extremely low humidity conditions or using other methods that minimize the presence of water. The issues described above regarding stability and long-term operational reliability are of particular importance for the development of organic lithium-ion cells, which on the one hand are characterized by a high energy and power density level, and on the other hand by a very high degree of operational reliability and a very long service life, including a particularly high number of usable charging and discharging cycles.

A further development known from prior art therefore provides for the use of an electrolyte based on sulfur dioxide ($SO_2$) instead of an organic electrolyte for rechargeable battery cells. Rechargeable battery cells that contain an electrolyte based on $SO_2$ exhibit a high level of ionic conductivity. The term "$SO_2$ based electrolyte" refers to an electrolyte which contains $SO_2$ not merely as an additive at low concentrations, but whose mobility of the ions in the conducting salt, which is contained in the electrolyte and which causes the charge transport, is at least in part, largely or even completely guaranteed by $SO_2$. The $SO_2$ therefore serves as a solvent for the conducting salt. The conducting salt and the gaseous $SO_2$ can form a liquid solvate complex, whereby the $SO_2$ is bound and the vapor pressure is noticeably reduced compared to the pure $SO_2$. In some instances, therefore, electrolytes that have a low vapor pressure can be produced. Compared to the organic electrolytes described above, these $SO_2$-based electrolytes offer the advantage that they are non-combustible. Safety risks, which might occur due to the electrolyte's flammability, can thus be reduced or substantially eliminated.

In this disclosure, unless otherwise stated, the term "substantially" is intended to encompass both wholly and largely but not wholly. For example, "substantially eliminated" safety risks due to the electrolyte's flammability is intended to encompass both a wholly eliminated safety risk that is due to the electrolyte's flammability or a safety risk that is largely reduced but not wholly eliminated.

Electrolyte decomposition also can be a problem with $SO_2$-based electrolytes, e.g., in high-energy applications or when there is overcharging. For example, EP 1201004 B1 refers to an $SO_2$-based electrolyte composed of $LiAlCl_4 * SO_2$ in combination with a positive electrode made of $LiCoO_2$. EP 1201004 B1 proposes the use of an additional salt to avoid interfering decomposition reactions when overcharging the rechargeable battery cell from a potential of 4.1 to 4.2 volts, such as the undesired formation of chlorine ($C_2$) from lithium tetrachloroaluminate ($LiAlCl_4$).

EP 2534719 B1 also reveals an $SO_2$-based electrolyte using $LiAlCl_4$, among others, as conducting salt. The $LiAlCl_4$ and the $SO_2$ form complexes of the formula $LiAlCl_4 * 1.5$ mol $SO_2$ or $LiAlCl_4 * 6$ mol $SO_2$. Lithium iron phosphate ($LiFePO_4$) is used as positive electrode. $LiFePO_4$ has a lower charge potential (3.7 V) compared to $LiCoO_2$ (4.2 V). Undesired overcharging reactions do not occur in this rechargeable battery cell, as the potential of 4.1 volts, that is harmful to the electrolyte, is not reached.

A further disadvantage that also occurs with these $SO_2$-based electrolytes is that any hydrolysis products produced due to residual amounts of water react to the cell components of the rechargeable battery. This in turn results in the formation of undesired by-products. When producing these types of rechargeable battery cells with an $SO_2$-based electrolyte, it is important to ensure that the amount of residual water contained in the electrolyte and the cell components is minimized.

Another problem encountered in making $SO_2$-based electrolytes is that many conducting salts, especially those known for organic lithium ion cells, are not soluble in $SO_2$. Measurements have shown that $SO_2$ is a poor solvent for many salts, such as Lithium fluoride (LiF), lithium bromide (LiBr), lithium sulfate ($Li_2SO_4$), lithium bis(oxalato)borate (LiBOB), lithium hexafluoroarsenate ($LiAsF_6$), lithium tetrafluoroborate ($LiBF_4$), trilithium hexafluoroaluminate ($Li_3AlF_6$), lithium hexafluoroantimonate ($LiSbF_6$), lithium difluoro(oxalato)borate ($LiBF_2C_2O_4$), lithium bis(trifluoromethanesulfonyl)imide (LiTFSI), lithium metaborate ($LiBO_2$), lithium aluminate ($LiAlO_2$), lithium triflate ($LiCF_3SO_3$) and lithium chlorosulfonate ($LiSO_3C$).

The solubilities of these salts in $SO_2$ are approx. $10^{-2}$-$10^{-4}$ mol/L (Table 1). At these low concentrations, it can be assumed that only low conductivities are present, which are not sufficient for an efficient operation of the rechargeable battery cell.

TABLE 1

Solubility of Different Salts in $SO_2$

| Salt | Solubility/ mol/L in $SO_2$ | Salt | Solubility/ mol/L in $SO_2$ |
|---|---|---|---|
| LiF | $2.1 \cdot 10^{-3}$ | $LiPF_6$ | $1.5 \cdot 10^{-2}$ |
| LiBr | $4.9 \cdot 10^{-3}$ | $LiSbF_6$ | $2.8 \cdot 10^{-4}$ |
| $Li_2SO_4$ | $2.7 \cdot 10^{-4}$ | $LiBF_2(C_2O_4)$ | $1.4 \cdot 10^{-4}$ |
| $LiB(C_2O_4)_2$ | $3.2 \cdot 10^{-4}$ | $CF_3SO_2NLiSO_2CF_3$ | $1.5 \cdot 10^{-2}$ |
| $Li_3PO_4$ | — | $LiBO_2$ | $2.6 \cdot 10^{-4}$ |
| $Li_3AlF_6$ | $2.3 \cdot 10^{-3}$ | $LiAlO_2$ | $4.3 \cdot 10^{-4}$ |
| $LiBF_4$ | $1.7 \cdot 10^{-3}$ | $LiCF_3SO_3$ | $6.3 \cdot 10^{-4}$ |
| $LiAsF_6$ | $1.4 \cdot 10^{-3}$ | | |

SUMMARY

In order to further improve the range of applications and properties of $SO_2$-based electrolytes and rechargeable battery cells containing such electrolytes, this disclosure provides $SO_2$-based electrolytes having the structure of Formula (I), described below, that possess one or more of the following properties:

has a wide electrochemical window, so that substantially no oxidative electrolyte decomposition occurs at the positive electrode;

forms a stable top layer on the negative electrode, whereby the top layer capacity should be low, and no further reductive electrolyte decomposition should occur on the negative electrode during further operation;

allows for operating rechargeable battery cells with high-voltage cathodes due to a wide electrochemical window;

exhibits good solubility for conducting salts and is therefore a good ionic conductor and electronic insulator, which facilitates ion transport and reduces self-discharge to a minimum;

is substantially inert to other components of the rechargeable battery cell, such as separators, electrode materials and cell packaging materials;

is substantially resistant to various misuses (e.g., electrical, mechanical or thermal misuse);

exhibits increased stability against amounts of residual water in cell components of rechargeable battery cells; and retaining substantial capacity at low temperatures.

Advantageously, such electrolytes can be used in rechargeable battery cells, including those which exhibit a very high energy and power density level, and can possess a high degree of operational reliability and a long service life, including a high number of usable charging and discharging cycles, without causing electrolyte decomposition during operation of the rechargeable battery cell.

This disclosure also provides rechargeable battery cells, which contain an $SO_2$-based electrolyte and provides one or more of the following properties, which properties, alone or in combination, may provide advantages over known rechargeable battery cells that contain an $SO_2$-based electrolyte:

good electrical performance, e.g., possessing a high energy density level;
good overcharge and excessive discharge capability;
low self-discharge;
a long service life, including a high number of usable charging and discharging cycles;
an acceptably low total weight for a given application;
good operational safety, even under more difficult environmental conditions, e.g., inside a vehicle; and
relatively low production costs.

Formula (I) Conducting Salts

This disclosure provides $SO_2$-based electrolytes for a rechargeable battery cells, which $SO_2$-based electrolytes comprise at least one conducting salt having the Formula (I)

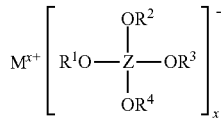

Formula (I)

In Formula (I), M is a metal chosen from the group consisting of alkali metals, alkaline earth metals, metals of group 12 of the periodic table of the elements, and aluminum. x is an integer from 1 to 3. The substituents $R^1$, $R^2$, $R^3$ and $R^4$ are each independently selected from the group consisting of $C_1$-$C_{10}$ alkyl; $C_2$-$C_{10}$ alkenyl; $C_2$-$C_{10}$ alkynyl; $C_3$-$C_{10}$ cycloalkyl; $C_6$-$C_{14}$ aryl; and $C_5$-$C_{14}$ heteroaryl. For example, the substituents $R^1$, $R^2$, $R^3$ and $R^4$ may each be independently selected from the group consisting of substituted and unsubstituted: $C_1$-$C_{10}$ alkyl; $C_2$-$C_{10}$ alkenyl; $C_2$-$C_{10}$ alkynyl; $C_3$-$C_{10}$ cycloalkyl; $C_6$-$C_{14}$ aryl; and $C_5$-$C_{14}$ heteroaryl. The central atom Z is either aluminum or boron. As shown in Formula (I), each of the $R^1$, $R^2$, $R^3$ and $R^4$ groups is bonded to the central atom via an oxygen atom. A conductive salt having a structure according to Formula (I) as defined above is referred to herein as a "Formula (I) conducting salt."

The $SO_2$-based electrolytes according to this disclosure contain $SO_2$ as an additive at low concentrations as well as at concentrations, which ensure mobility of the ions of the conducting salt(s) contained in the electrolyte and causes the charge transport, at least in part, largely or even completely by means of $SO_2$. The Formula (I) conducting salt is dissolved in the electrolyte and advantageously exhibits a solubility that meets or preferably exceeds the minimum acceptable solubility for the specific electrolyte composition and cell requirements. The $SO_2$ generally will be present in the $SO_2$-based electrolyte an amount of from 5 to 99.4% by weight.

Depending on the chemical structure, the Formula (I) conducting salt may form a liquid solvate complex with the gaseous $SO_2$ in which the $SO_2$ is bound. In this case, the vapor pressure of the liquid solvate complex decreases significantly compared to the pure $SO_2$, leading to the production of electrolytes with low vapor pressure. However, depending on the chemical structure of the Formula (I) conducting salt, it is also possible that no reduction of the vapor pressure may occur during the production of the electrolyte. In such case, it may be advantageous to work at low temperature and/or under pressure when producing such electrolyte.

In addition to including at least one Formula (I) conducting salt, the $SO_2$-based electrolyte also may contain one or more additional conducting salts. Such additional conducting salt(s) may include one or more additional Formula (I) conducting salts and/or one or more conducting salts having a structure other than Formula (I) (hereinafter, a "Non-Formula (I) conducting salt").

The at least one Formula (I) conducting salt generally will be present in the $SO_2$-based electrolyte in an amount of from 0.6 to 95% by weight. The $SO_2$-based electrolyte may contain multiple different Formula (I) conducting salts, e.g., two, three, four or more different Formula (I) conducting salts. The cumulative total weight of all Formula (I) conducting salts in the $SO_2$-based electrolyte is from 0.6 to 95% by weight of the $SO_2$-based electrolyte. The cumulative molar concentration of the Formula (I) conducting salt(s) in the $SO_2$-based electrolyte generally will be within the range of 0.05 mol/l to 10 mol/l. Included within this range are ranges of from 0.1 mol/l to 6 mol/l, 0.2 mol/l to 5 mol/l, 0.5 mol/l to 4 mol/l, and 0.2 mol/l to 3.5 mol/l relative to the total volume of the $SO_2$-based electrolyte.

The term "alkyl," as used in the description of the Formula (I) conducting salts, refers to linear or branched saturated hydrocarbon groups. The alkyl may be, for example, a $C_1$-$C_{10}$ alkyl, a $C_1$-$C_6$ alkyl, or a $C_2$-$C_4$ alkyl, which refers to linear or branched chain saturated hydrocarbon groups having 1-10, 1-6 and 2-4 carbon atoms, respectively. Exemplary $C_1$-$C_{10}$ alkyls include, in particular, methyl, ethyl, n-propyl, isopropyl, n-butyl, sec-butyl, iso-butyl, tert-butyl, n-pentyl, iso-pentyl, 2.2-dimethylpropyl, n-hexyl, iso-hexyl, 2-ethylhexyl, n-heptyl, iso-heptyl, n-octyl, iso-octyl, n-nonyl, n-decyl and the like. Exemplary $C_1$-$C_6$ alkyls include, in particular, methyl, ethyl, n-propyl, isopropyl, n-butyl, sec-butyl, iso-butyl, tert-butyl, n-pentyl, iso-pentyl, 2.2-dimethylpropyl, n-hexyl und iso-hexyl. Exemplary $C_2$-$C_4$ alkyl include, in particular, 2-propyl, methyl and ethyl. The alkyl groups may be unsubstituted or substituted with one or more atoms and/or groups of atoms.

The term "alkenyl," as used in the description of the Formula (I) conducting salts, refers to unsaturated linear or branched hydrocarbon groups whereby the hydrocarbon groups have at least one C—C-double bond. The alkenyl may be, for example, a $C_2$-$C_{10}$ alkenyl, a $C_2$-$C_6$ alkenyl, or a $C_2$-$C_4$ alkenyl, which are unsaturated linear or branched chain hydrocarbon groups having 2-10, 2-6 and 2-4 carbons, respectively. Exemplary $C_2$-$C_{10}$ alkenyls include, in particular, ethenyl, 1-propenyl, 2-propenyl, 1-n-butenyl, 2-n-butenyl, iso-butenyl, 1-pentenyl, 1-hexenyl, 1-heptenyl, 1-octenyl, 1-nonenyl, 1-decenyl and the like. The alkenyl groups may be unsubstituted or substituted with one or more atoms and/or groups of atoms. Exemplary $C_2$-$C_6$ alkenyls include, in particular, ethenyl, 1-propenyl, 2-propenyl, 1-n-butenyl, 2-n-butenyl, iso-butenyl, 1-pentenyl and 1-hexenyl. Exemplary $C_2$-$C_4$ alkenyls include, in particular, ethenyl and 1-propenyl.

The term "alkynyl," as used in the description of the Formula (I) conducting salts, refers to unsaturated linear or branched hydrocarbon groups whereby the hydrocarbon groups have at least one C—C-triple bond. The alkynyl may be, for example, a $C_2$-$C_{10}$ alkynyl, a $C_2$-$C_6$ alkynyl, or a $C_2$-$C_4$ alkynyl, which are unsaturated linear or branched hydrocarbon groups having from 2-10, 2-6 and 2-4 carbon atoms, respectively, and include at least one C—C-triple bond. Exemplary $C_2$-$C_{10}$ alkynyls include, in particular, ethinyl, 1-propynyl, 2-propynyl, 1-n-butinyl, 2-n-butinyl, iso-butinyl, 1-pentinyl, 1-hexinyl, 1-heptinyl, 1-octinyl, 1-noninyl, 1-decinyl and the like. Exemplary $C_2$-$C_6$ alkynyls include, in particular, ethinyl, 1-propynyl, 2-propynyl, 1-n-butinyl, 2-n-butinyl, iso-butinyl, 1-pentinyl and 1-hexinyl. Exemplary $C_2$-$C_4$ alkynyls include, in particular, ethinyl, 1-propynyl, 2-propynyl, 1-n-butinyl, 2-n-butinyl, iso-butinyl. The alkynyl groups may be unsubstituted or substituted with one or more atoms and/or groups of atoms.

The term "cycloalkyl," as used in the description of the Formula (I) conducting salts, refers to cyclical, saturated hydrocarbon groups. The cycloalkyl may be, for example, a $C_3$-$C_{10}$ cycloalkyl or a $C_3$-$C_6$ cycloalkyl, which have 3-10 and 3-6 carbon atoms, respectively. Exemplary $C_3$-$C_{10}$ cycloalkyls include, in particular, cyclopropyl, cyclobutyl, cyclopentyl, cyclohexyl, cycloheptyl, cyclohexyl, cyclononyl and cyclodecanyl. Exemplary $C_3$-$C_6$ cycloalkyls include, in particular, cyclopropyl, cyclobutyl, cyclopentyl, cyclohexyl, cycloheptyl and cyclohexyl. The cycloalkyl groups may be unsubstituted or substituted with one or more atoms and/or groups of atoms.

The term "aryl," as used in the description of the Formula (I) conducting salts, refers to aromatic hydrocarbon groups. The aryl may be, for example, a $C_6$-$C_{14}$ aryl, which has six to fourteen carbon atoms in one or more rings. Exemplary aryls include, in particular, phenyl ($C_6H_5$ group), naphthyl ($C_{10}H_7$ group) and anthracyl ($C_{14}H_9$ group). The aryl groups may be unsubstituted or substituted with one or more atoms and/or groups of atoms.

The term "heteroaryl," as used in the description of the Formula (I) conducting salts, refers to aromatic hydrocarbon groups, with at least one atom replaced by a nitrogen, oxygen or sulfur atom. The heteroaryl may be, for example, a $C_5$-$C_{14}$ heteroaryl or a $C_5$-$C_7$ heteroaryl, which have 5-14 and 5-7, carbon atoms, respectively, in one or more rings. Exemplary heteroaryls include, in particular, pyrrolyl, furanyl, thiophenyl, pyrridinyl, pyranyl, thiopyranyl and the like. The heteroaryl groups may be unsubstituted or substituted with one or more atoms and/or groups of atoms.

Substituted Formula (I) Conducting Salts

As noted above, the $R^1$, $R^2$, $R^3$ and $R^4$ independently may be substituted or unsubstituted. As also noted above, the substitutions may be with one or more atoms and/or groups of atoms, i.e., one or more individual atoms or atom groups of the alkyl; alkenyl; alkynyl; cycloalkyl; aryl; and/or heteroaryl substituents may be replaced by one or more atoms and/or chemical groups.

For example, in one aspect of this disclosure, one of $R^1$, $R^2$, $R^3$ and $R^4$ comprises a substituent independently selected from the group consisting of: at least one fluorine atom; at least one group that comprises at least one fluorine atom; at least one chemical group that is a $C_1$-$C_4$ alkyl, $C_2$-$C_4$ alkenyl, $C_2$-$C_4$ alkynyl, phenyl or benzyl (as those groups are described above); or a combination of one or more of such substituents. Such substitutions may improve the solubility of the at least one Formula (I) conducting salt in the $SO_2$.

In another aspect of this disclosure, two of $R^1$, $R^2$, $R^3$ and $R^4$ are the same or different and comprise substituents independently selected from the group consisting of: at least one fluorine atom; at least one group that comprises at least one fluorine atom; at least one chemical group that is a $C_1$-$C_4$ alkyl, $C_2$-$C_4$ alkenyl, $C_2$-$C_4$ alkynyl, phenyl or benzyl (as those groups are described above); or a combination of one or more of such substituents. Such substitutions may improve the solubility of the at least one Formula (I) conducting salt in the $SO_2$-based electrolyte.

In another aspect of this disclosure, three of $R^1$, $R^2$, $R^3$ and $R^4$ are the same or different and comprise substituents independently selected from the group consisting of: at least one fluorine atom; at least one group that comprises at least one fluorine atom; at least one chemical group that is a $C_1$-$C_4$ alkyl, $C_2$-$C_4$ alkenyl, $C_2$-$C_4$ alkynyl, phenyl or benzyl (as those groups are described above); or a combination of one or more of such substituents.

In another aspect of this disclosure, each of $R^1$, $R^2$, $R^3$ and $R^4$ are the same or different and comprise a substituent independently selected from the group consisting of: at least one fluorine atom; at least one group that comprises at least one fluorine atom; at least one chemical group that is a $C_1$-$C_4$ alkyl, $C_2$-$C_4$ alkenyl, $C_2$-$C_4$ alkynyl, phenyl or benzyl (as those groups are described above); or a combination of one or more of such substituents.

In another aspect, one of $R^1$, $R^2$, $R^3$ and $R^4$ comprises a substituent independently selected from a $CF_3$ group, an $OSO_2CF_3$ group, or a combination thereof. In another aspect, two of $R^1$, $R^2$, $R^3$ and $R^4$ are the same or different and comprise a substituent independently selected from independently selected from a $CF_3$ group, an $OSO_2CF_3$ group, or a combination thereof. In another aspect, three of $R^1$, $R^2$, $R^3$ and $R^4$ are the same or different and comprise a substituent independently selected from independently selected from a $CF_3$ group, an $OSO_2CF_3$ group, or a combination thereof. In another aspect, all four of $R^1$, $R^2$, $R^3$ and $R^4$ are the same or different and comprise a substituent independently selected from independently selected from a $CF_3$ group, an $OSO_2CF_3$ group, or a combination thereof. Such substitutions may improve the solubility of the at least one Formula (I) conducting salt in the $SO_2$-based electrolyte.

In another aspect, one of the $R^1$, $R^2$, $R^3$ and $R^4$ comprises at least two substituents independently selected from a $CF_3$ group, an $OSO_2CF_3$ group, or a combination thereof. In another aspect, two of the substituents $R^1$, $R^2$, $R^3$ and $R^4$ are the same or different and comprise at least two substituents independently selected from a $CF_3$ group, an $OSO_2CF_3$ group, or a combination thereof. In another aspect, three of $R^1$, $R^2$, $R^3$ and $R^4$ are the same or different and comprise at least two substituents independently selected from a $CF_3$ group, an $OSO_2CF_3$ group, or a combination thereof. In another aspect, all four of $R^1$, $R^2$, $R^3$ and $R^4$ are the same or different and comprise at least two substituents independently selected from a $CF_3$ group, an $OSO_2CF_3$ group, or a combination thereof. Such substitutions may improve the solubility of the at least one Formula (I) conducting salt in the $SO_2$-based electrolyte.

In another aspect, one of the $R^1$, $R^2$, $R^3$ and $R^4$ comprises at least three substituents independently selected from a $CF_3$ group, an $OSO_2CF_3$ group, or a combination thereof. In another aspect, two of the substituents $R^1$, $R^2$, $R^3$ and $R^4$ are the same or different and comprise at least three substituents independently selected from a $CF_3$ group, an $OSO_2CF_3$ group, or a combination thereof. In another aspect, three of the substituents $R^1$, $R^2$, $R^3$ and $R^4$ are the same or different and comprise at least three substituents independently selected from a $CF_3$ group, an $OSO_2CF_3$ group, or a combination thereof. In another aspect, all four of the substituents $R^1$, $R^2$, $R^3$ and $R^4$ are the same or different and comprise at least three substituents independently selected from a $CF_3$ group, an $OSO_2CF_3$ group, or a combination thereof. Such substitutions may improve the solubility of the at least one Formula (I) conducting salt in the $SO_2$-based electrolyte.

In another aspect of this disclosure, the at least one Formula (I) conducting salt is selected from a group consisting of the following and combinations thereof:

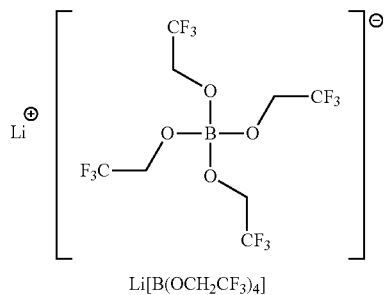

Li[B(OCH$_2$CF$_3$)$_4$]

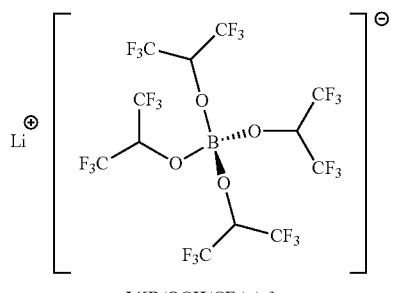

Li[B(OCH(CF$_3$)$_2$)$_4$]

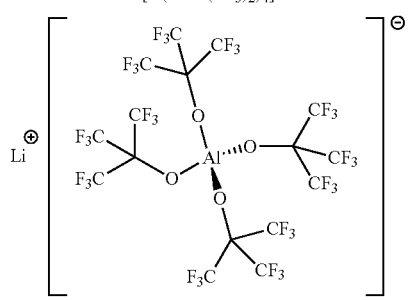

Li[Al(OC(CF$_3$)$_3$)$_4$]

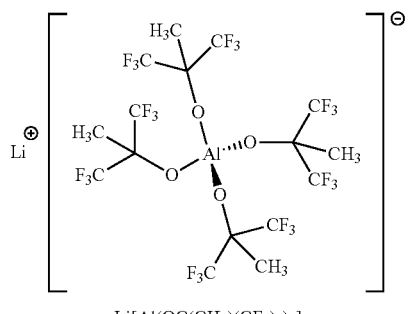

Li[Al(OC(CH$_3$)(CF$_3$)$_2$)$_4$]

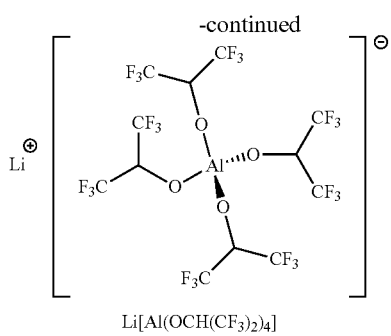

Li[Al(OCH(CF$_3$)$_2$)$_4$]

Electrolytes Comprising a Formula (I) Conducting Salt

In an aspect of this disclosure, therefore, an electrolyte according to this disclosure comprises at least one Formula (I) conducting salt in which substituents $R^1$, $R^2$, $R^3$ and $R^4$ are each independently selected from the group consisting of substituted or unsubstituted: alkyl; alkenyl; alkynyl; cycloalkyl; phenyl; and heteroaryl.

In another aspect, an electrolyte according to this disclosure comprises at least one Formula (I) conducting salt in which substituents $R^1$, $R^2$, $R^3$ and $R^4$ are each independently selected from the group consisting of substituted or unsubstituted: $C_1$-$C_6$ alkyl; $C_2$-$C_6$ alkenyl; $C_2$-$C_6$ alkynyl; $C_3$-$C_6$ cycloalkyl; phenyl; and $C_5$-$C_7$ heteroaryl.

In another aspect, an electrolyte according to this disclosure comprises at least one Formula (I) conducting salt in which substituents $R^1$, $R^2$, $R^3$ and $R^4$ are each independently selected from the group consisting of substituted and unsubstituted: $C_2$-$C_4$ alkyl; $C_2$-$C_4$ alkenyl; $C_2$-$C_4$ alkynyl; $C_3$-$C_6$ cycloalkyl; phenyl; and $C_5$-$C_7$ heteroaryl.

In another aspect, an electrolyte according to this disclosure comprises at least one Formula (I) conducting salt in which substituents $R^1$, $R^2$, $R^3$ and $R^4$ are each independently selected from the group consisting of substituted and unsubstituted: 2-propyl, methyl and ethyl; ethenyl and propenyl; $C_2$-$C_4$ alkynyl; $C_3$-$C_6$ cycloalkyl; phenyl; and $C_5$-$C_7$ heteroaryl.

In another aspect, an electrolyte according to this disclosure comprises at least one Formula (I) conducting salt in which one, two, three or all of $R^1$, $R^2$, $R^3$ and $R^4$ comprise a substituent independently selected from the group consisting of: at least one fluorine atom; at least one group that comprises at least one fluorine atom; at least one chemical group that is a $C_1$-$C_4$ alkyl, $C_2$-$C_4$ alkenyl, $C_2$-$C_4$ alkynyl, phenyl or benzyl (as those groups are described above); or a combination of one or more of such substituents.

In another aspect, an electrolyte according to this disclosure comprises at least one Formula (I) conducting salt in which one, two, three or all of $R^1$, $R^2$, $R^3$ and $R^4$ comprise one, two or three substituents independently selected from the group consisting of a $CF_3$ group, and $OSO_2CF_3$ group, or a combination thereof.

In another aspect, an electrolyte according to this disclosure comprises at least one Formula (I) conducting salt selected from the group consisting of Li[B (OCH$_2$CF$_3$)$_4$], Li[B(OCH(CF$_3$)$_2$)$_4$], Li[Al(OC(CF$_3$)$_3$)$_4$], Li[Al(OC(CH$_3$)(CF$_3$)$_2$)$_4$] and Li[Al(OCH(CF$_3$)$_2$)$_4$].

In another aspect, the $SO_2$-based electrolyte comprises at least two different Formula (I) conducting salts. In an aspect, the $SO_2$-based electrolyte comprises at least three different Formula (I) conducting salts.

$SO_2$-based electrolytes of this disclosure may possess one or more advantages over prior known electrolytes because Formula (I) conducting salts can have a higher oxidation stability level and are thus substantially resistant to oxidation at higher cell voltages that may be encountered in some rechargeable batteries. Consequently, such $SO_2$-based electrolytes experience reduced or substantially no decomposition at higher cell voltages that may be encountered in some rechargeable batteries. Such $SO_2$-based electrolytes may be substantially resistant to oxidation at cell voltages selected from the group consisting of up to 4.0 volts, up to 4.2 volts, up to 4.4 volts, up to 4.6 volts, up to 4.8 volts, up to 5.0 volts, or up to a potential exceeding 5.0 volts, e.g., up to 5.2 volts, 5.4 volts, 5.6 volts, 5.8 volts or 6.0 volts. As a result, there is little or no electrolyte decomposition within the working potential of both electrodes of the rechargeable battery cell, when using such an electrolyte in a rechargeable battery cell. This property can significantly prolong the service life of the electrolyte compared to electrolytes that are not as resistant to oxidation at such cell voltages.

As seen below in Example 9, $SO_2$-based electrolytes of this disclosure also can be more resistant to losing their discharge capacity at low temperatures.

$SO_2$-based electrolytes of this disclosure also can be less susceptible to problems caused by small amounts (in the ppm-range) of residual water in the electrolyte. That is because hydrolysis products of $SO_2$-based electrolytes comprising the at least one Formula (I) conducting salt, when reacting with water, form hydrolysis products that are significantly less aggressive towards the cell components as compared to, e.g., organic cells that employ the conducting salt $LiPF_6$. As a result, the absence of water in the $SO_2$-based electrolytes comprising at least one Formula (I) conducting salt is less critical than for other known electrolytes.

The $SO_2$-based electrolytes comprising at least one Formula (I) conducting salts, however, do have a significantly larger anion size compared to state-of-the-art conducting salts such as $LiAlCl_4$. This larger anion size can present a disadvantage by leading to a lower conductivity of the Formula (I) conducting salts when compared to the conductivity of common conducting salts such as $LiAlCl_4$.

Additional Conductive Salts Having a Structure not of Formula (I)

In order to adjust the conductivity and/or further properties of the $SO_2$-based electrolyte to a desired value, at least one Non-Formula (I) conducting salt can be added to the $SO_2$-based electrolyte. This means that in addition to the one or more Formula (I) conducting salts, the $SO_2$-based electrolyte also may contain one or more Non-Formula (I) conducting salts. Such Non-Formula (I) conducting salts, when present, will be present in an amount up to 25% by weight of the $SO_2$-based electrolyte and typically the amount will be up to 20% by weight, up to 15% by weight, up to 10% by weight and up to 5% by weight of the $SO_2$-based electrolyte.

In aspects of this disclosure, the at least one Non-Formula (I) conducting salt comprises an alkali metal compound, e.g., a lithium compound. The alkali metal compound is selected from the group consisting of an aluminate, a halide, an oxalate, a borate, a phosphate, an arsenate and a gallate. For example, in aspects the at least one Non-Formula (I) conducting salt comprises a lithium-containing compound selected from the group consisting of a lithium aluminate, a lithium halide, a lithium oxalate, a lithium borate, a lithium phosphate, a lithium arsenate and a lithium gallate.

In an aspect of this disclosure, the at least one Non-Formula (I) conducting salt comprises a lithium tetrahalogenoaluminate, e.g., $LiAlCl_4$.

Additives Other than Conducting Salts

In other aspects, the $SO_2$-based electrolyte contains at least one additive that is not a conducting salt, i.e., a "non-conducting salt additive" and improves one or more properties of the $SO_2$-based electrolyte, its conducting salt(s), and/or rechargeable battery. The at least one non-conducting salt additive is preferably selected from the group formed by vinylene carbonate and its derivatives, vinyl ethylene carbonate and its derivatives, methyl ethylene carbonate and its derivatives, lithium (bisoxalato)borate, lithium difluoro(oxalato)borate, Lithium tetrafluoro(oxalato)phosphate, lithium oxalate, 2-vinylpyridine, 4-vinylpyridine, cyclic exomethylenecarbonates, sultones, cyclic and acyclic sulfonates, acyclic sulfites, cyclic and acyclic sulfinates, organic esters of inorganic acids, acyclic and cyclic alkanes, of which acyclic and cyclic alkanes have a boiling point of at least 36° C. at 1 bar, aromatic compounds, halogenated cyclic and acyclic sulfonylimides, halogenated cyclic and acyclic phosphate esters, halogenated cyclic and acyclic phosphines, halogenated cyclic and acyclic phosphites, halogenated cyclic and acyclic phosphazenes, halogenated cyclic and acyclic silylamines, halogenated cyclic and acyclic halogenated esters, halogenated cyclic and acyclic amides, halogenated cyclic and acyclic anhydrides and halogenated organic heterocycles. Such non-conductive salt additive(s), when present, commonly is/are present in cumulative amounts of up to 10% by weight of the $SO_2$-based electrolyte, but can be present in higher weight percentages.

The $SO_2$-based electrolytes of this disclosure may thus comprise:
 (i) 5 to 99.4% by weight of $SO_2$, and
 (ii) 0.6 to 95% by weight of all Formula (I) conducting salts.

Additionally, in aspects of this disclosure, the $SO_2$-based electrolytes of this disclosure may comprise:
 (iii) 0 to 25% by weight of all Non-Formula (I) conducting salts; and
 (iv) 0 to 10% by weight of all non-conducting salt additives.

The total amount of $SO_2$ and the Formula (I) conducting salt(s) may be greater than 50 percent by weight (wt %) of the weight of the electrolyte, and typically will be greater than 60 wt %, 70 wt %, 80 wt %, 85 wt %, 90 wt %, 95 wt %, or 99 wt %, with the higher percentages, e.g., greater than 95 wt % often being employed.

The electrolyte may contain at least 5 wt % of $SO_2$ based on the total amount of the electrolyte contained in the rechargeable battery cell, with values of 20 wt % of $SO_2$, 40% by weight of $SO_2$ and 60% by weight being more commonly employed. The electrolyte may also contain up to 95 wt % of $SO_2$, with maximum values of 90 wt % of $SO_2$ and 80 wt % of $SO_2$ being preferred in this order.

Additionally, the $SO_2$-based electrolyte may comprise at least one organic solvent. Typically, the proportion of organic substances or other material(s), e.g., combustible and/or explosive materials, in the $SO_2$-based electrolyte, for example in the form of one or more solvents or additives, will range from 0 to not more than 50 wt % based on the weight of the electrolyte, e.g., not more than 40% by weight, not more than 30% by weight, not more than 20% by weight, not more than 15% by weight, not more than 10% by weight, not more than 5% by weight, not more than 1% by weight of the electrolyte, and substantially 0% by weight of the electrolyte. That is, the $SO_2$-based electrolyte may be substantially free of organic solvents and/or other combustible and/or explosive material(s). By keeping the content of organic solvents and other organic substances or other combustible or explosive materials in the $SO_2$-based electrolyte low or even zero, the electrolyte is either barely combustible or substantially not combustible, which in turn increases the operational safety of rechargeable battery cells that employ an $SO_2$-based electrolyte as disclosed herein. An $SO_2$-based electrolyte that is substantially free of organic materials, thus has advantageous properties.

The $SO_2$-based electrolytes of this disclosure, and thus the rechargeable batteries of this disclosure, may contain up to about 2600 moles of $SO_2$ per mole of conducting salt. In aspects, the $SO_2$-based electrolytes contain at least 0.1 mol $SO_2$, at least 1 mol $SO_2$, at least 5 mol $SO_2$, at least 10 mol $SO_2$, at least 20 mol $SO_2$ per mol of conducting salt. The electrolyte may also contain higher molar proportions of $SO_2$, e.g., up to 100 mol $SO_2$, 200 mol $SO_2$, 500 mol $SO_2$, 1000 mol $SO_2$, 1500 mol $SO_2$, and 2000 mol $SO_2$ per mol of conducting salt. Within the foregoing amounts are ranges of 0.1-2.5 mol $SO_2$, 2.5-5.0 mol $SO_2$, 5.0-7.5 mol $SO_2$, 7.5-10 mol $SO_2$, 10-15 mol $SO_2$, 15-20 mol $SO_2$, 15-25 mol $SO_2$, 20-25 mol $SO_2$, 25-50 mol $SO_2$, 50-75 mol $SO_2$, 75-100 mol $SO_2$, 100-500 mol $SO_2$, 500-1000 mol $SO_2$, 1000-1500 mol $SO_2$, 1500-2000 mol $SO_2$, and 2000-2600 mol $SO_2$ per mol of conducting salt. The term "per mole of conducting salt" refers to all conducting salts contained in the electrolyte, i.e., both the Formula (I) and Non-Formula (I) conducting salts. $SO_2$-based electrolytes with the concentration ratio between $SO_2$ and the conducting salt offer the advantage that they can dissolve a larger amount of conducting salt than state-of-the-art electrolytes, which are based on an organic solvent blend, for example.

For rechargeable battery cells of this disclosure, it has been found that an electrolyte with a relatively low concentration of conducting salt in the $SO_2$ can be advantageous despite the associated higher vapor pressure with the increased amount of $SO_2$, particularly in terms of stability over many charging and discharging cycles of the rechargeable battery cell. The concentration of $SO_2$ in the electrolyte affects its conductivity. By selecting the $SO_2$-concentration, the conductivity of the electrolyte can thus be adapted to the intended use of a rechargeable battery cell operated by means of this electrolyte.

Rechargeable Battery Cells

According to another aspect of this disclosure, there is provided a rechargeable battery cell that contains an $SO_2$-based electrolyte according to this disclosure. Furthermore, the rechargeable battery cell according to this disclosure comprises an active metal, at least one positive electrode, at least one negative electrode and a housing.

Active Metal

During charging, the ions of the active metal of the rechargeable battery cell are discharged from the positive electrode and inserted into the negative electrode. During discharging the reverse process occurs. The ions of the active metal are transported between the electrodes by means of the electrolyte, which has the required ion mobility. In aspects of this disclosure, the active metal of the rechargeable battery is selected from the following:

an alkali metal, in particular lithium or sodium;
an alkaline earth metal, in particular calcium;
a metal of group 12 of the periodic table of the elements, in particular zinc; and
aluminum.

Negative Electrodes

Aspects of this disclosure provide rechargeable battery cells in which the negative electrode is an insertion electrode. This insertion electrode contains an insertion material as active material that the ions of the active metal are stored in during charging of the rechargeable battery cell and that the ions of the active metal can be removed from during discharging of the rechargeable battery cell. This means that the electrode processes can take place not only on the surface of the electrodes, but also inside the negative electrode. For example, if a conducting salt based on lithium is used, lithium ions can be stored in the insertion material during charging of the rechargeable battery cell and removed from the insertion material during discharging of the rechargeable battery cell. The negative electrode preferably contains carbon as active material or insertion material, in particular in the form of graphite. However, it is also in the scope of this disclosure that carbon is provided in the form of natural graphite (flake or rounded), synthetic graphite (mesophase graphite), graphitized mesocarbon microbeads (MCMB), with carbon-coated graphite or amorphous carbon.

In another advantageous further embodiment of the rechargeable battery cell, the negative electrode includes lithium-intercalation-anode active material that contains no carbon, such as lithium titanate (e.g., $Li_4Ti_5O_{12}$).

In another aspect of rechargeable battery cells according to this disclosure, the negative electrode with lithium comprises alloy-forming anode active materials. These include lithium-storing metals and alloys (e.g., Si, Ge, Sn, $SnCo_xC_y$, $SnSi_x$ and the like) and oxides of the lithium-storing metals and alloys (e.g., $SnO_x$, $SiO_x$, oxide glasses of Sn, Si and the like).

In another aspect of rechargeable battery cells according to this disclosure, the negative electrode contains conversion-anode active materials. These conversion anode active materials can be, for example, transition metal oxides in the form of manganese oxides ($MnO_x$), iron oxides ($FeO_x$), cobalt oxides ($CoO_x$), nickel oxides ($NiO_x$, copper oxides ($CuO_x$) or metal hydrides in the form of magnesium hydride ($MgH_2$), titanium hydride ($TiH_2$), aluminum hydride ($AlH_3$) and boron-, aluminum- and magnesium-based ternary hydrides and the like.

In another aspect of rechargeable battery cells according to this disclosure, the negative electrode comprises a metal, in particular metallic lithium.

In another aspect of rechargeable battery cells according to this disclosure, the negative electrode is porous. In such aspects, the maximum porosity may be selected from the group consisting of 50%, 45%, 40%, 35%, 30%, 20% and 10%. The porosity represents the cavity volume in relation to the total volume of the negative electrode, whereby the cavity volume is formed by so-called pores or cavities. This porosity enlarges the inner surface of the negative electrode. It also reduces the density of the negative electrode and thus its weight. The individual pores of the negative electrode can preferably be substantially filled with the electrolyte during operation.

In another aspect of rechargeable battery cells according to this disclosure, the negative electrode has a conducting element. This means that in addition to the active material or insertion material, the negative electrode includes a conducting element. This conducting element is used to enable the necessary electronically conductive connection of the active material of the negative electrode. For this purpose, the conducting element is in contact with the active material of the electrode reaction of the negative electrode. This conducting element can be planar shaped in the form of a thin metal sheet or a thin metal foil. The thin metal foil preferably has a perforated or mesh-like structure.

In another aspect of rechargeable battery cells according to this disclosure, the active material of the negative electrode can be applied to the surface of the thin metal sheet or foil. Such planar conducting elements typically have a thickness in the range of 5 µm to 50 µm, including a thickness in the range of 10 µm to 30 µm. When planar conducting elements are used, the negative electrode can have a total thickness of at least 20 µm, at least 40 µm, or at least 60 µm. The maximum thickness is usually 200 µm or less, 150 µm or less, or 100 µm or less. Included within such thicknesses are ranges of 20-200 µm, 40-150 µm, and 60-100 µm. In aspects, the area-specific capacitance of the negative electrode is selected from the group consisting of at least 0.5 mAh/cm$^2$, at least 1.0 mAh/cm$^2$, at least 3 mAh/cm$^2$, at least 5 mAh/cm$^2$, and at least 10 mAh/cm$^2$ when a planar conducting element is used.

In another aspect of rechargeable battery cells according to this disclosure, the conducting element may consist of a three-dimensional porous metal structure, e.g., a metal foam. The term "three-dimensional porous metal structure" refers to any structure made of metal that extends not only like a thin metal sheet or metal foil over the length and width of the electrode surface area, but also over its thickness. The three-dimensional porous metal structure is sufficiently porous such that the active material of the negative electrode can be incorporated into the pores of the metal structure. The amount of active material incorporated or applied is the loading of the negative electrode. In aspects of this disclosure, when the conducting element consists of a three-dimensional porous metal structure, e.g., a metal foam, then the negative electrode has a thickness selected from the group consisting of at least 0.2 mm, at least 0.3 mm, at least 0.4 mm, at least 0.5 mm, and at least 0.6 mm, with greater thicknesses typically providing loadings of active material. Such electrodes thus can be significantly thicker in comparison to the negative electrodes that are often are used for lithium-ion cells that employ organic-solvent electrolytes.

In another aspect of rechargeable battery cells according to this disclosure, the area-specific capacitance of the negative electrode, when used with a three-dimensional discharge element such as a metal foam, is selected from the group consisting of at least 2.5 mAh/cm$^2$, at least 5 mAh/cm$^2$, at least 10 mAh/cm$^2$, at least 15 mAh/cm$^2$, at least 20 mAh/cm$^2$, at least 25 mAh/cm$^2$, and at least 30 mAh/cm$^2$, with the higher values typically being preferred.

In aspects where the conducting element consists of a three-dimensional porous metal structure such as a metal foam, the amount of active material of the negative electrode, i.e., the loading of the electrode relative to its surface, is selected from the group consisting of at least 10 mg/cm$^2$, at least 20 mg/cm$^2$, at least 40 mg/cm$^2$, at least 60 mg/cm$^2$, at least 80 mg/cm$^2$ and at least 100 mg/cm$^2$, with the higher values typically being preferred. This loading of the negative electrode has a positive effect on the charging and discharging process of the rechargeable battery cell and allows the building of high energy battery cells.

In other aspects of rechargeable battery cells according to this disclosure, the negative electrode comprises at least one binder. This binder may be a fluorinated binder such as a polyvinylidene fluoride and/or a terpolymer formed from tetrafluoroethylene, hexafluoropropylene and vinylidene fluoride. However, it may also be a binder consisting of a polymer composed of monomeric structural units of a conjugated carboxylic acid or of the alkali metal, alkaline earth metal or ammonium salt of this conjugated carboxylic acid or of a combination thereof. In addition, or in the alternative, the binder may also comprise a polymer based on monomeric styrene and butadiene structural units and/or a binder of the group of carboxymethylcelluloses. Typically, the weight of the binder(s) in the negative electrode will be in an amount that is not more than 30% by weight relative to the total weight of the electrode, e.g., not more than 25%, not more than 20%, not more than 15%, not more than 10%, not more than 7%, not more than 5% by weight, or not more than 2% by weight relative to the total weight of the electrode, e.g., 0.5 to 2.0%, 1-5%, 2.5-5%, 2-8%, 4-8%, 5-10%, 5-7.5%, 7.5%, 7.5-10%, 10-20%, 10-12.5%, 12.5-15%, 10-15%, 15-20%, 20-25%, 25-30%, about 0.5 to 2.0%, about 1-5%, about 2.5-5%, about 2-8%, about 4-8%, about 5-10%, about 5-7.5%, about 7.5-10%, about 10-20%, about 10-12.5%, about 12.5-15%, about 10-15%, about 15-20%, about 10-20%, about 20-25%, about 25-30%, with lower percentages by weight generally being preferred. The addition of a binding agent improves the long-term stability and service life of the rechargeable battery cell.

Positive Electrodes

The positive electrode also consists of an insertion material that is suitable for absorbing ions of the active metal.

In aspects of this disclosure, the positive electrode contains at least one intercalation compound as active material. For the purpose of this disclosure, the term "intercalation compound" means a subcategory of the insertion materials described above. This intercalation compound functions as a host matrix, with empty spaces that are interconnected. The ions of the active metal can diffuse into these empty spaces during the discharge process of the rechargeable battery cell and be stored there. During the deposition of the ions of the active metal, only minor or no structural changes occur in the host matrix.

One preferred intercalation compound for the positive electrode has the following composition $Li_xM'_yM''_zO_a$, wherein:

M' is at least one metal chosen from the group consisting of the elements Ti, V, Cr, Mn, Fe, Co, Ni, Cu and Zn;

M" is at least one element chosen from the group, consisting of elements of the groups 2, 3, 4, 5, 6, 7, 8, 9, 10, 11, 12, 13, 14, 15 and 16 of the periodic table of the elements;

x and y are greater than 0;

z is greater than or equal to 0; and a is greater than 0.

The indices y and z refer to the totality of metals and elements represented by M' and M" respectively. For example, if M' contains two metals M'$_1$ and M'$_2$, the following applies to the index y: y=y1+y2, where y1 and y2 represent the indices of the metals M'$_1$ and M'$_2$. The indices x, y, z and a must be selected in such a way that charge neutrality prevails within the composition. In aspects, a=4, i.e., the intercalation compound has the formula $Li_xM'_yM''_zO_4$. In aspects when the intercalation compound has the formula $Li_xM'_yM''_zO_4$, M' is iron and M" is phosphorus, i.e., the intercalation compound is lithium iron phosphate ($LiFePO_4$). In other aspects when the intercalation compound has the formula $Li_xM'_yM''_zO_4$, M' is manganese and M" is cobalt, i.e., the intercalation compound is lithium cobalt manganese oxide ($LiCoMnO_4$). $LiCoMnO_4$ can be used to produce so-called high-voltage electrodes for high-energy cells with a cell voltage of over 5 volts. In such aspects, the $LiCoMnO_4$ is preferably free of $Mn^3$.

In other aspects of the rechargeable battery cell according to this disclosure, M' consists of the metals nickel and manganese and M" is cobalt, e.g., intercalation compounds of the formula $Li_xNi_{y1}Mn_{y2}Co_zO_2$ (NMC). Examples of such intercalation compounds of lithium nickel manganese cobalt oxide are $LiN_{1/3}Mn_{1/3}Co_{1/3}O_2$ (NMC111), $LiNi_{0.6}Mn_{0.2}Co_2O_2$ (NMC622) and $LiNi_{0.8}Mn_{0.1}Co_{0.1}O_2$ (NMC811).

In other aspects of the rechargeable battery cell according to this disclosure, high-voltage electrodes can be cycled to an upper potential selected from the group consisting of at least up to 4.0 volts, at least up to 4.2 volts, at least up to 4.4 volts, at least up to 4.6 volts, at least up to a 4.8 volts, up to a potential of 5.0 volts, or up to a potential exceeding 5.0 volts, e.g., up to 5.2 volts, 5.4 volts, 5.6 volts, 5.8 volts or 6.0 volts, with higher potentials generally being preferred for such high-voltage electrodes.

In other aspects of the rechargeable battery cell according to this disclosure, the positive electrode comprises at least one metal compound selected from the group consisting of a metal oxide, a metal halide and a metal phosphate. In aspects, the metal is a transition metal with an atomic number of 22 to 28 of the periodic table of the elements, and in particular, cobalt, nickel, manganese or iron are preferred.

In other aspects of the rechargeable battery cell according to this disclosure, the positive electrode has a conducting element. This means that in addition to the active material, the positive electrode includes a conducting element. This conducting element provides the necessary electronically conductive connection of the active material of the positive electrode. For this purpose, the conducting element is in contact with the active material of the electrode which reacts in the positive electrode. This conducting element can be planar shaped in the form of a thin metal sheet or a thin metal foil. The thin metal foil preferably can have a perforated or mesh-like structure. In such embodiments, the active material of the positive electrode is preferably applied to the surface of the thin metal sheet or foil. Such planar conducting elements typically can have a thickness in the range of 5 μm to 50 μm, e.g., from 10 μm to 30. When planar conducting elements are used, the positive electrode can have a total thickness of at least 20 μm, at least 40 μm, or at least 60 μm. The maximum thickness is 200 μm or less, preferably 150 μm or less and most preferably 100 μm or less. Included within such thicknesses are ranges of 20-200 μm, 40-150 μm, and 60-100 μm. In aspects, the area-specific capacitance of the positive electrode is selected from the group consisting of at least 0.5 mAh/cm², at least 1.0 mAh/cm², at least 3 mAh/cm², at least 5 mAh/cm², and at least 10 mAh/cm² when a planar conducting element is used.

Furthermore, the conducting element of the positive electrode may consist of a three-dimensional porous metal structure, e.g., a metal foam. The three-dimensional porous metal structure is sufficiently porous such that the active material of the positive electrode can be incorporated into the pores of the metal structure. The amount of active material incorporated or applied is the loading of the positive electrode. If the conducting element consists of a three-dimensional porous metal structure such as a metal foam, then the positive electrode preferably has a thickness selected from the group consisting of at least 0.2 mm, at least 0.3 mm, at least 0.4 mm, at least 0.5 mm, and at least 0.6 mm.

In other aspects of the rechargeable battery cell according to this disclosure, the area-specific capacitance of the positive electrode, when used with a three-dimensional discharge element such as metal foam, is selected from the group consisting of at least 2.5 mAh/cm², at least 5 mAh/cm², at least 10 mAh/cm², at least 15 mAh/cm², at least 20 mAh/cm², at least 25 mAh/cm², and at least 30 mAh/cm², with the higher values typically being preferred. If the conducting element consists of a three-dimensional porous metal structure, in particular of a metal foam, the amount of active material of the positive electrode (i.e., the loading of the electrode relative to its surface), is selected from the group consisting of at least 10 mg/cm², at least 20 mg/cm², at least 40 mg/cm², at least 60 mg/cm², at least 80 mg/cm² and at least 100 mg/cm², with the higher values typically being preferred.

This loading of the positive electrode has a positive effect on the charging and discharging process of the rechargeable battery cell and allows the building of high energy battery cells.

In other aspects of rechargeable battery cells according to this disclosure, the positive electrode comprises at least one binder. This binder may be a fluorinated binder such as a polyvinylidene fluoride and/or a terpolymer formed from tetrafluoroethylene, hexafluoropropylene and vinylidene fluoride. However, it may also be a binder consisting of a polymer composed of monomeric structural units of a conjugated carboxylic acid or of the alkali metal, alkaline earth metal or ammonium salt of this conjugated carboxylic acid or of a combination thereof. In addition, or in the alternative, the binder may also comprise a polymer based on monomeric styrene and butadiene structural units and/or a binder of the group of carboxymethylcelluloses. Typically, the weight of the binder(s) in the positive electrode will be in an amount that is not more than 30% by weight relative to the total weight of the electrode, e.g., not more than 25%, not more than 20%, not more than 15%, not more than 10%, not more than 7%, not more than 5% by weight, or not more than 2% by weight relative to the total weight of the electrode, e.g., 0.5 to 2.0%, 1-5%, 2.5-5%, 2-8%, 4-8%, 5-10%, 5-7.5%, 7.5%, 7.5-10%, 10-20%, 10-12.5%, 12.5-15%, 10-15%, 15-20%, 20-25%, 25-30%, about 0.5 to 2.0%, about 1-5%, about 2.5-5%, about 2-8%, about 4-8%, about 5-10%, about 5-7.5%, about 7.5-10%, about 10-20%, about 10-12.5%, about 12.5-15%, about 10-15%, about 15-20%, about 10-20%, about 20-25%, about 25-30%, with lower percentages by weight generally being preferred. The addition of a binding agent improves the long-term stability and service life of the rechargeable battery cell.

Design of the Rechargeable Battery Cell

Rechargeable battery cells according to this can comprise multiple negative electrodes and multiple positive electrodes that are alternately stacked in a housing. The positive electrodes and the negative electrodes are preferably electrically separated from each other by separators.

The separators may consist of a non-woven material, a membrane, woven or knitted material, organic material, inorganic material or a combination thereof. Organic separators may consist of unsubstituted polyolefins (e.g., polypropylene or polyethylene), partially to completely halogen-substituted polyolefins (e.g., partially to completely fluorine-substituted, in particular PVDF, ETFE, PTFE), polyesters, polyamides or polysulfones. Separators, which combine organic and inorganic materials, include, for example, glass fiber textile materials whose glass fibers are coated with a suitable polymer. The coating preferably contains a fluorine-containing polymer such as polytetrafluoroethylene (PTFE), ethylene-tetrafluoroethylene (ETFE), perfluoroethylene propylene (FEP), THV (terpolymer of tetrafluoroethylene, hexafluoroethylene and vinylidene fluoride) or a perfluoroalkoxy-polymer (PFA), an aminosilane, a polypropylene (PP) or polyethylene (PE). The separator in the housing of the rechargeable battery cell can also be folded, for example "z-folded," With z-folding, a strip-shaped separator is folded z-like through or around the electrodes. The separator can also be designed as a separator paper.

In aspects of this disclosure, the separator is designed as a sheath, whereby one or more electrodes, or each positive electrode or each negative electrode is enveloped by the sheath. This sheath may consist of a non-woven material, a membrane, woven or knitted material, organic material, inorganic material or a combination thereof.

A sheath covering the positive electrode may lead to a more uniform ion migration and ion distribution in the rechargeable battery cell. The more even the ion distribution is, especially in the negative electrode, the higher the possible charge of the negative electrode with active material and consequently the usable capacity of the rechargeable battery cell. At the same time, risks associated with uneven charging and the resulting separation of the active metal are avoided. These advantages are particularly evident when the positive electrodes of the rechargeable battery cell are enveloped by a sheath.

The surface dimensions of the electrodes and of the sheath can preferably be matched to each other in such a manner that the outer dimensions of the sheath and the outer dimensions of the electrode coincide in at least one dimension.

The surface area of the sheath can preferably be greater than the surface area of the electrode. In this case, the sheath extends beyond the edge of the electrode. Two pieces of sheath, which cover the electrode on both sides, can therefore be joined together at the edge of the positive electrode by an edge connector.

In other aspects of this disclosure, the negative electrodes of the rechargeable cell have a sheath, while the positive electrodes do not have a sheath.

Rechargeable batteries as disclosed herein thus may be suitable for a wide range of potential uses and applications, including but not limited to:
- multi-cell battery packs consisting of multiple lithium-ion cells
- automotive and recreational vehicle power supply, e.g., for electric and hybrid automobiles, or for providing power to such vehicles, e.g., as a battery for starter motors or for running equipment;
- large transportation vehicles such as trucks, locomotives and ships;
- smaller transportation devices such as golf carts, motorcycles, bicycles, scooters, ATVs, Segways and similar self-propelled devices;
- battery-powered toys and games;
- emergency power backup or uninterruptible power supply (UPS), electrical grid storage (e.g., for storing electric energy at times of low demand for use during peak periods, distributed electricity generation and stand-alone power systems;
- solar and wind power energy storage;
- marine devices such as boats and boat motors or for running equipment on boats;
- personal and small electronic devices such as laptops, tablets, phones;
- gaming devices and accessories such as remote controls and 3D headsets;
- surveillance or alarm system power supply
- personal mobility equipment such as electric wheelchairs and stair lifts,
- industrial machinery such as forklifts,
- robots and robotic devices such as vacuums,
- lawn and garden equipment such as mowers, trimers and chain saws,
- construction equipment such as power tools;
- farm equipment such as tractors;
- aircraft, including airplanes, helicopters and drones;
- household appliances;
- portable powerpacks for providing electrical power supply (including for recharging other rechargeable batteries); and
- most applications where an internal combustion engine is currently used.

Multiple battery types may be produced, including batteries typically used in household devices, e.g., sizes AAA, AA, C, D, 9V, 18650, 21700 and 26650.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
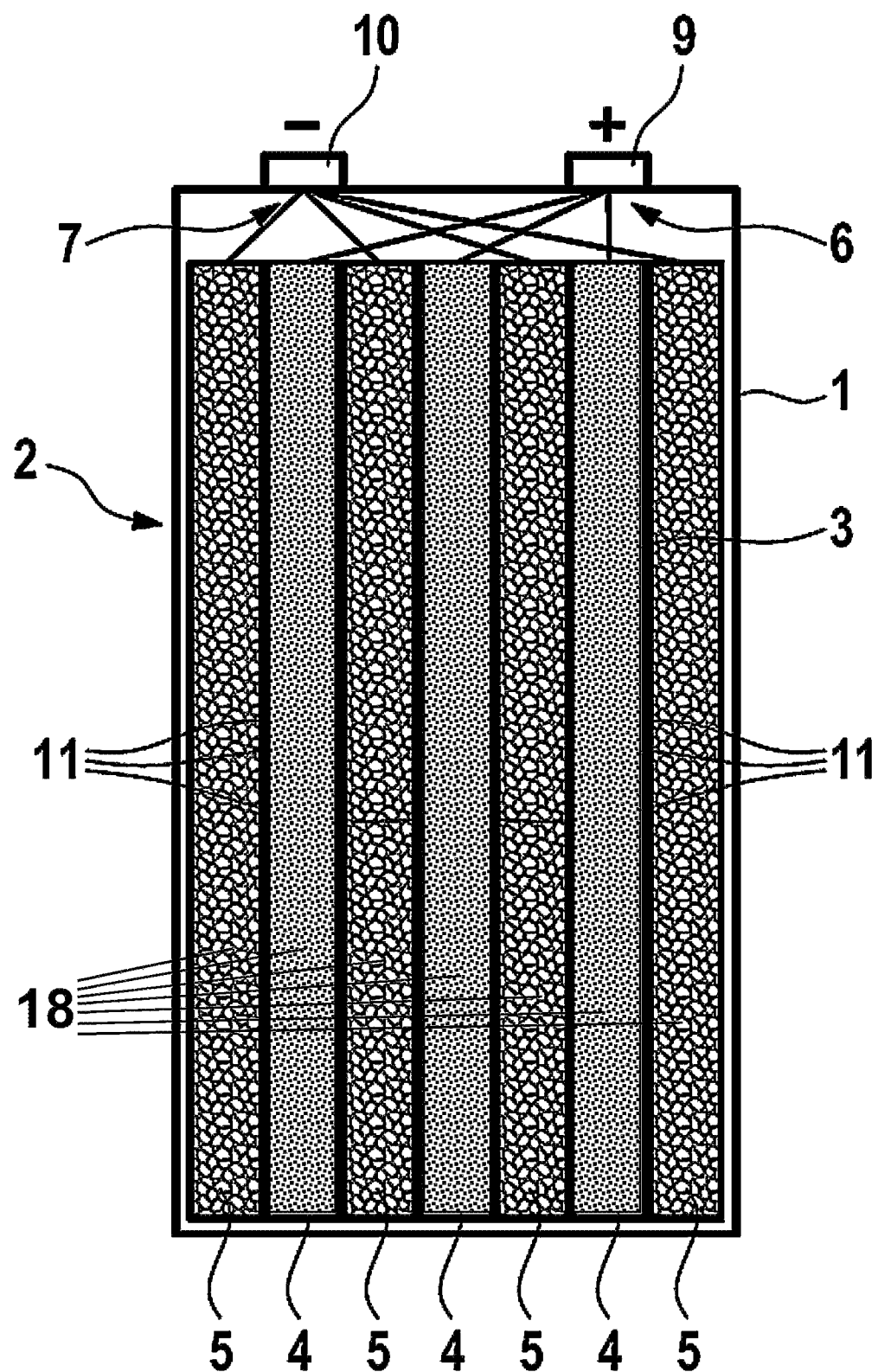
FIG. 1 illustrates an example of a rechargeable battery cell according to this disclosure, shown in a cross-section.

Referring now to the figures, FIG. 1 shows a first embodiment example of a rechargeable battery cell 2 according to this disclosure in a cross-sectional diagram. This rechargeable battery cell 2 is designed as a prismatic cell and, among other things, has a housing 1. This housing 1 encloses an electrode array 3, comprising three positive electrodes 4 and four negative electrodes 5. The positive electrodes 4 and the negative electrodes 5 are alternately stacked in the electrode array 3. Housing 1 can, however, also accommodate more positive electrodes 4 and/or negative electrodes 5. In general, it is preferred that the number of negative electrodes 5 is one greater than the number of positive electrodes 4. As a result, the front surfaces of the electrode stack consist of the electrode surfaces of the negative electrodes 5. The electrodes 4, 5 are connected via electrode connections 6, 7 with corresponding contacts 9, 10 of the rechargeable battery cell 2. The rechargeable battery cell 2 is filled with an electrolyte based on $SO_2$ in such a manner that the electrolyte penetrates as completely as possible into all pores or cavities, particularly within the electrodes 4, 5. The electrolyte is not visible in FIG. 1. In this embodiment, the positive electrodes 4 contain an intercalation compound as active material. This intercalation compound is $LiCoMnO_4$.

In this embodiment example, electrodes 4, 5 have a flat design, i.e., layers of low thickness in relation to their surface area. They are separated from each other by separators 11. Housing 1 of the depicted rechargeable battery cell 2 is essentially cuboid in shape, the electrodes 4, 5 and the walls of housing 1 shown in cross-sectional diagram extending perpendicularly to the drawing layer and being essentially straight and flat. However, the rechargeable battery cell 2 can also be used as a winding cell in which the electrodes consist of thin layers wound together with a separator material. The separators 11 separate the positive electrode 4 and negative electrode 5 spatially and electrically, but they are also permeable to the ions of the active metal. In this way, large electrochemically effective surfaces are created, which enable a correspondingly high-power yield.

Electrodes 4, 5 also have a discharge element, not depicted in FIG. 1, which allows for the necessary electronically conductive connection of the active material of the respective electrode. This conducting element is in contact with the active material involved in the electrode reaction of the respective electrode 4, 5 (not depicted in FIG. 1). The conducting element consists of porous metal foam 18. This metal foam 18 extends over the entire thickness of the electrodes 4, 5. The active material of the positive electrodes 4 and the negative electrodes 5 is incorporated into the pores of this metal foam 18 so that it fills its pores uniformly over the entire thickness of the metal structure. To improve their mechanical strength, the positive electrodes 4 also contain a binder. This binder is a fluoropolymer. The negative electrodes 5 contain carbon as an active material in a form suitable for the absorption of lithium ions. The structure of the negative electrode 5 is similar to that of the positive electrode 4.

Figure 2:
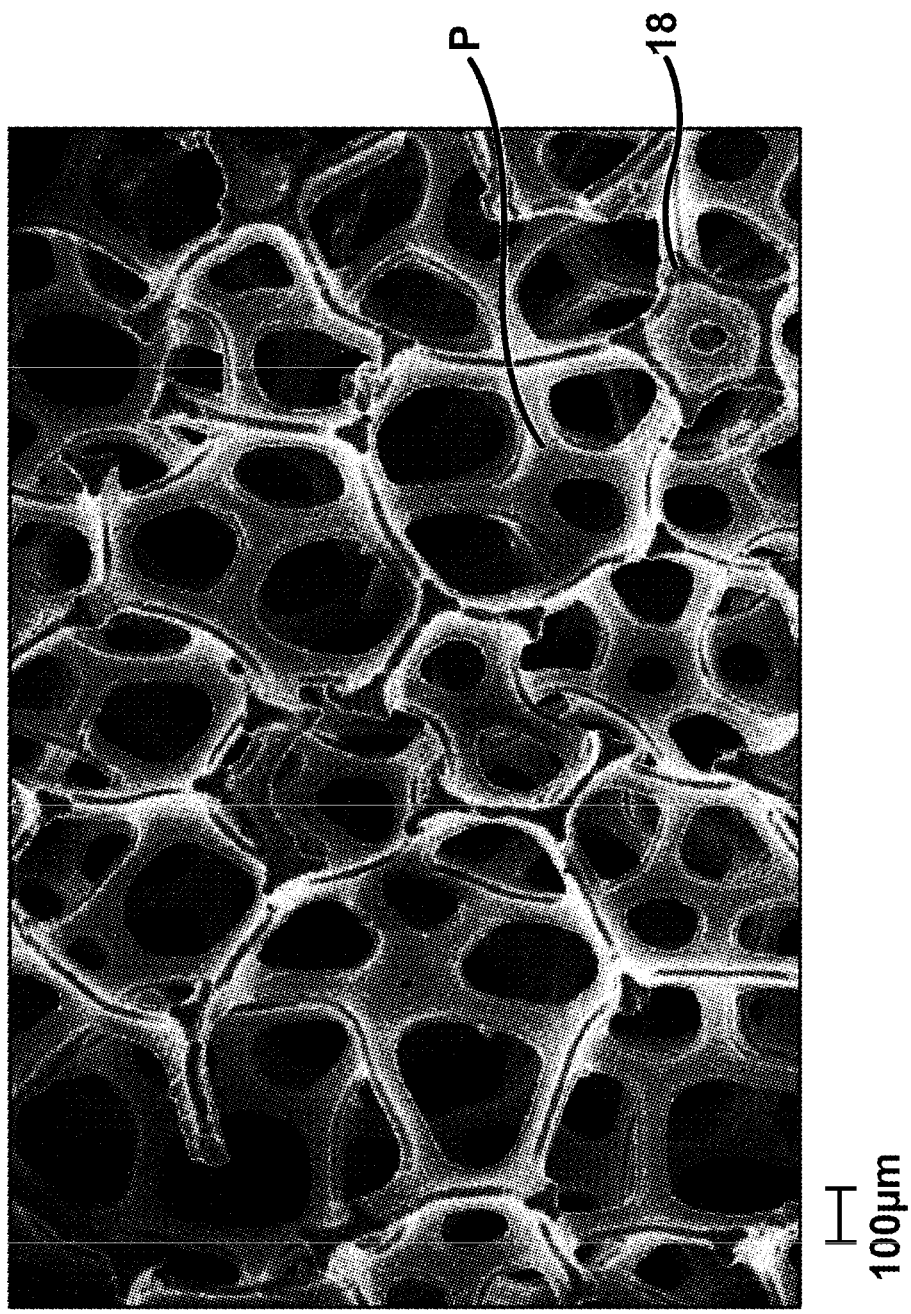
FIG. 2 shows a detailed electron microscope image of the three-dimensional porous structure of the metal foam electrode shown in FIG. 1.

FIG. 2 shows a detailed electron microscope image of the three-dimensional porous structure of the metal foam 18 of the first embodiment example in FIG. 1. The scale shows that the pores P have an average diameter of more than 100 µm, i.e., they are relatively large.

Figure 3:
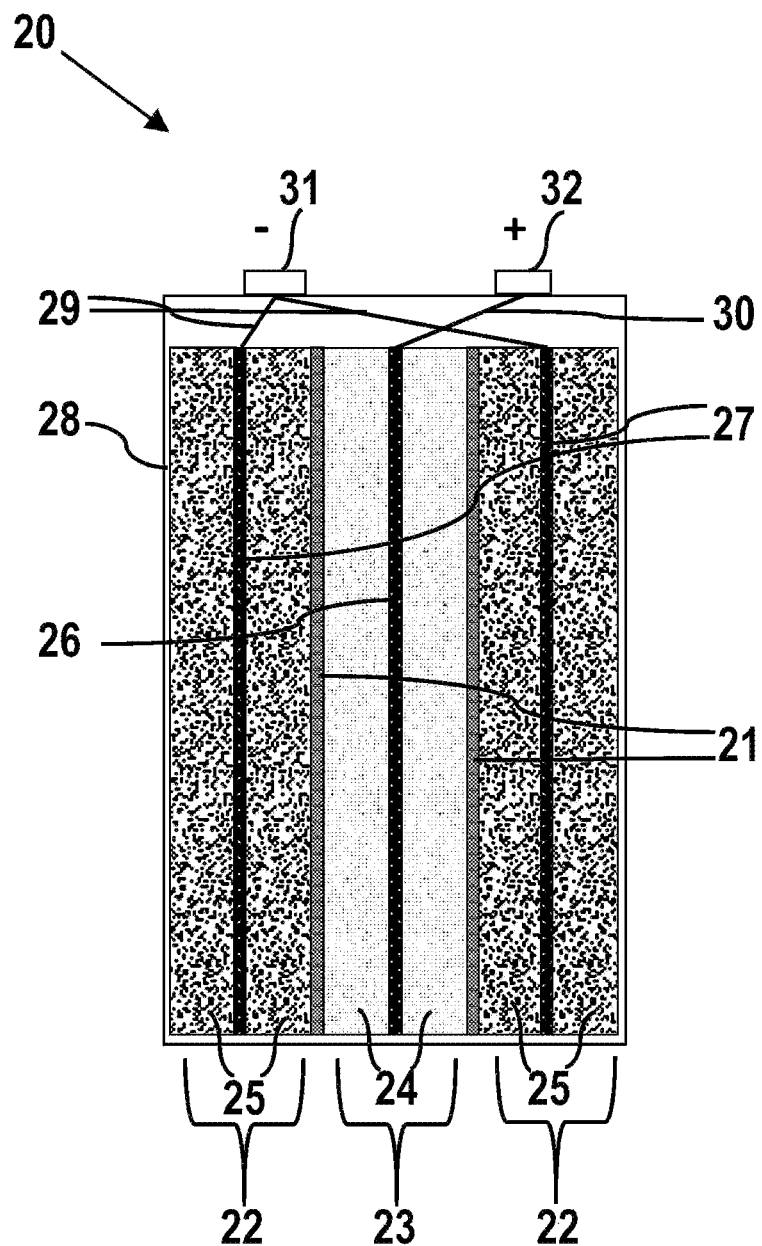
FIG. 3 illustrates another example of a rechargeable battery cell according to this disclosure, shown in cross-section.

FIG. 3 illustrates another embodiment of a rechargeable battery cell 20 according to this disclosure, shown in a cross-sectional diagram. This rechargeable battery cell 20 is designed as a prismatic cell and, among other things, has a housing 28. The electrodes 22 and 23 are connected via electrode connections 29 and 30 with corresponding contacts 31 and 32 of the rechargeable battery cell 20. The rechargeable battery cell 20 is filled with an electrolyte based on $SO_2$ in such a manner that the electrolyte penetrates as completely as possible into all pores or cavities, particularly within the electrodes 22 and 23. The electrolyte is not visible in FIG. 3. In this embodiment, the electrode arrangement comprises one positive electrode 23 and two negative electrodes 22. The positive electrode 23 has a conducting element 26 in the form of a planar metal foil to which the active material 24 of the positive electrode 23 is applied on both sides. The negative electrodes 22 also include a conducting element 27 in the form of a planar metal foil to which the active material 25 of the negative electrode 22 is applied on both sides. The electrodes are separated from each other by separators 21.

In an alternative embodiment (not shown), the planar conducting elements of the edge electrodes, i.e., the electrodes that close off the electrode stack, can only be coated with active material on one side. The uncoated side faces the housing wall.

Figure 4:
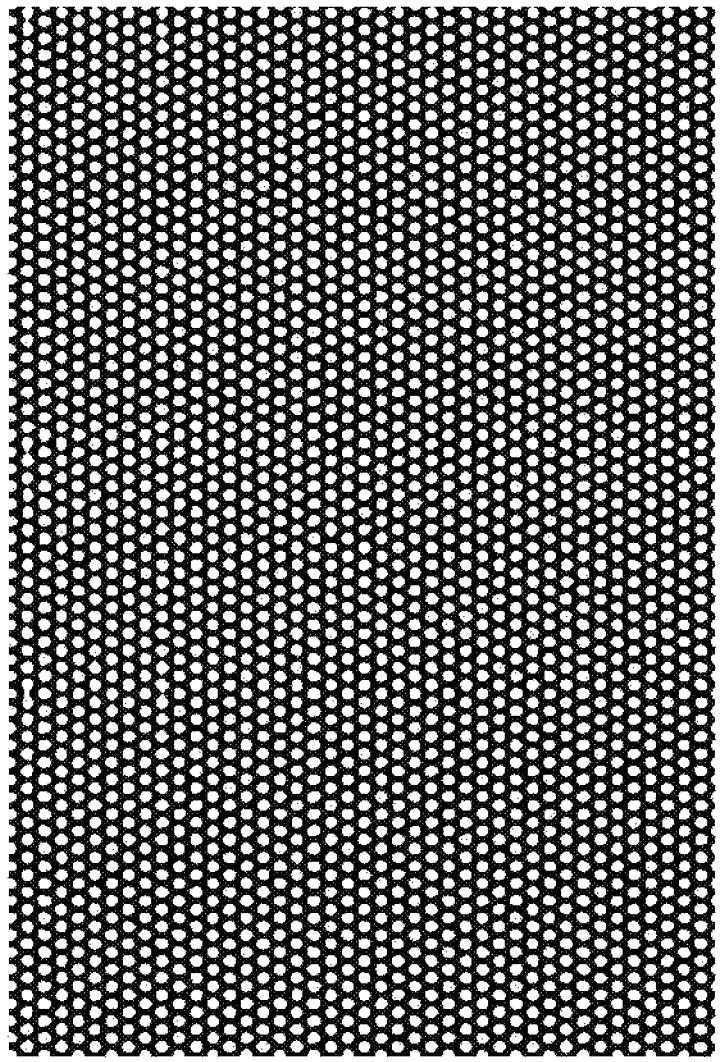
FIG. 4 illustrates a planar metal foil that serves as a conducting element for the positive and negative electrodes the embodiment shown in FIG. 3.

FIG. 4 illustrates one example of a planar metal foil that can serve as a conducting element for the positive and/or negative electrodes in rechargeable battery cells of this disclosure. This metal foil has a perforated or mesh-like structure with a thickness of, e.g., 20 µm.

Figure 5:
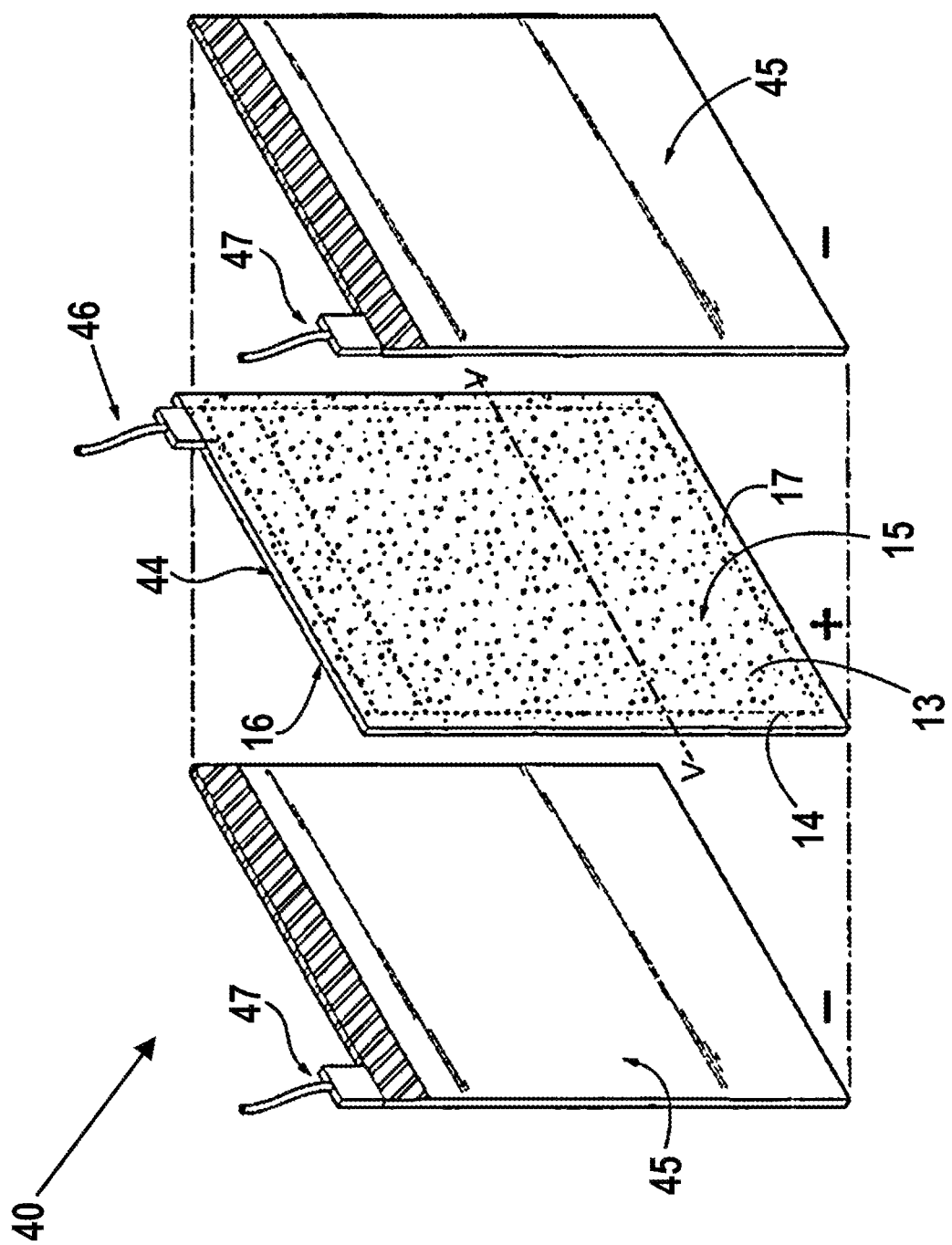
FIG. 5 illustrates, in exploded view, an example of sheathed electrodes that may be employed a rechargeable battery cell according to this disclosure.

FIG. 5 illustrates, in exploded view, exemplary electrode configurations 40 within the scope of this disclosure. In this embodiment, the positive electrode 44 is enveloped with a sheath 13. A surface area of the sheath 13 is greater than a surface area of the positive electrode 44, the boundary of which is drawn as dashed line 14. Two layers 15, 16 of the sheath 13, covering the positive electrode 44 on both sides, are connected to each other at the circumferential edge of the positive electrode 44 via an edge connector 17. In this embodiment, the negative electrodes 45 are non-sheathed electrodes. The electrodes 44 and 45 can be connected via the electrode connections 46 and 47.

Example 1: Preparation of a Reference Electrolyte

An electrolyte used as a reference for the examples described below was prepared according to the procedure described in patent specification EP 2 954 588 B1 (hereinafter the "Reference Electrolyte"). Lithium chloride (LiCl) was first dried under vacuum at 120° C. for three days. Aluminum particles (Al) were dried under vacuum at 450° C. for two days. LiCl, aluminum chloride ($AlCl_3$) and Al were mixed at a molar ratio of $AlCl_3$:LiCl:Al of 1:1.06:0.35 in a glass bottle with an opening allowing gas to escape. This mixture was then heat-treated in stages to produce a molten salt. After cooling, the molten salt formed was filtered, then cooled to room temperature. Finally, $SO_2$ was added until the desired molar ratio of $SO_2$ to $LiAlCl_4$ was formed. The Reference Electrolyte thus formed had the composition $LiAlCl_4*xSO_2$, where x depends on the amount of $SO_2$ added.

Example 2: Preparation of Exemplary Electrolytes According to this Disclosure

For the experiments described below, three exemplary electrolytes according to this disclosure were prepared (hereinafter referred to as Electrolytes 1, 2 and 3). For this purpose, first three different conducting salts were prepared according to Formula (I) of a manufacturing process described in the following documents:

I. Krossing, *Chem. Eur. J.* 2001, 7, 490;
S. M. Ivanova et al., *Chem. Eur. J.* 2001, 7, 503;
Tsujioka et al., *J. Electrochem. Soc.,* 2004, 151, A1418

These three different conducting salts according to Formula (I) are hereinafter referred to as Compounds 1, 2 and 3. They stem from the family of polyfluoroalkoxyaluminates and were prepared in hexane according to the following reaction equation starting with $LiAlH_4$ and the corresponding alcohol R—OH with $R^1=R^2=R^3=R^4$.

Compounds 1, 2 and 3 with the following sum and structural formulas were formed:

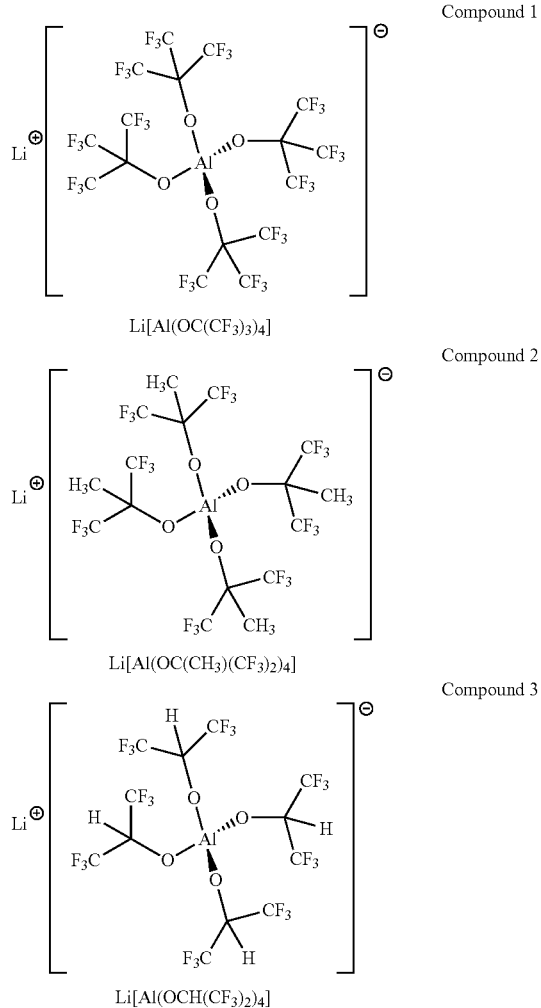

For purification, Compounds 1, 2 and 3 were first recrystallized. This removed residues of the educt $LiAlH_4$ from the conducting salts, since this educt could possibly lead to spark formation with any traces of water in $SO_2$.

Subsequently, Compounds 1, 2 and 3 were dissolved in $SO_2$. It was found that Compounds 1, 2 and 3 dissolve well in $SO_2$.

The preparation of Electrolytes 1, 2 and 3 was carried out at low temperature or under pressure according to process steps 1 to 4 listed below:
1) Presentation of the respective Compound 1, 2 and 3 in a pressure piston with riser pipe,
2) Evacuation of the pressure pistons,
3) Inflow of liquid $SO_2$ and
4) Repetition of steps 2+3 until the target amount of $SO_2$ was added.

The respective concentration of Compounds 1, 2 and 3 in Electrolytes 1, 2 and 3 was 1 mol/l (substance concentration related to 1 liter of the electrolyte), unless stated otherwise in the experiment description. The experiments described below were carried out with Electrolytes 1, 2 and 3 and the Reference Electrolyte.

Example 3: Production of Full Cells

The full cells used in the experiments described below are rechargeable battery cells with two negative electrodes and one positive electrode, each separated by a separator. The positive electrodes contained $LiFePO_4$ as an active material, a conductivity mediator and a binder. The negative electrodes contained graphite as active material and a binder. The full cells were each filled with the electrolyte required for the experiments, i.e., either with the Reference Electrolyte or Electrolytes 1, 2 or 3.

Several, i.e., two to four identical full cells were produced for each experiment. The results presented in the experiments are mean values of the measurement values obtained for the identical full cells.

Experiment 1: Investigation of Possible Negative Effects of the Presence of Compounds 1 and 3 on the Cycling Behavior of Full Cells In order to test whether the presence of a Formula (I) conducting salt according to this disclosure had a negative effect on the cycling behavior of full cells, mixed electrolytes were first prepared which contained 5 wt % of either Compound 1 or Compound 3 in the Reference Electrolyte.

Figure 6:
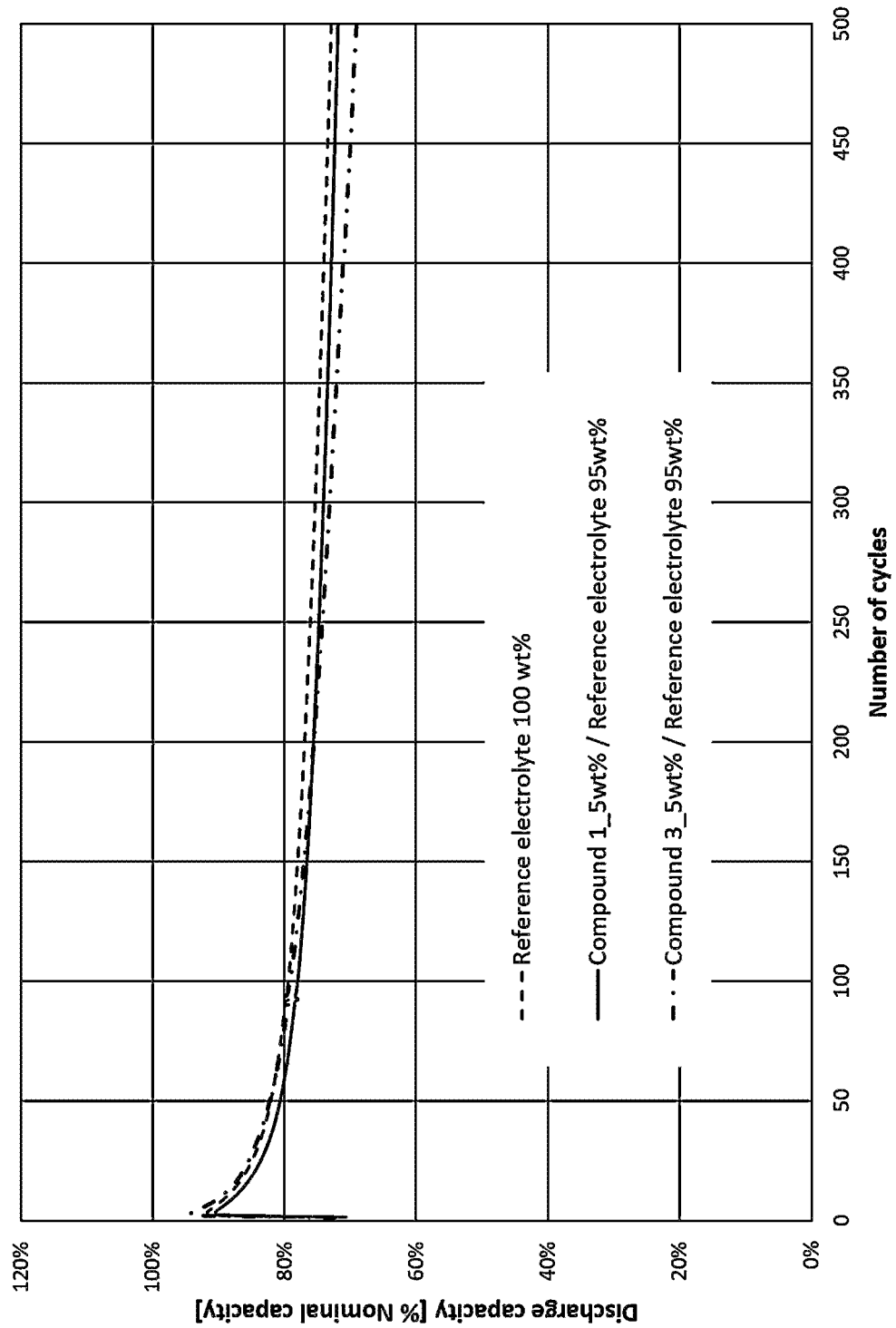
FIG. 6 shows the discharge capacity as a function of the number of cycles of full cells containing either the Reference Electrolyte (prepared according to Example 1), or a mixed electrolyte comprising Compound 1 or Compound 3 in the Reference Electrolyte.

Mixed electrolytes consisting of 95 weight percent (wt %) Reference Electrolyte and 5 wt % Compound 1 or 5 wt % Compound 3 were prepared for this purpose. The two mixed electrolytes were compared with a pure Reference Electrolyte (100 wt %). For this purpose, experiments were carried out in full cells as described in Example 3. Full cells were filled with different electrolytes. The full cells were charged with 50 mA up to a potential of 3.6 V. The potential of 3.6 volts was maintained until the current dropped to 40 mA. The discharge was performed with a current of 50 mA to a potential of 2.5 V. 500 charge/discharge cycles were performed. FIG. 6 shows three discharge curves, i.e., the discharge capacities as a function of the number of cycles. All electrolytes showed nearly the same discharge capacity.

It can be concluded from this that the addition of 5 wt % of either Compound 1 or 3 in the Reference Electrolyte has no serious negative effects on cycling behavior of full cells containing the Reference Electrolyte.

Experiment 2: Function of Disclosed Electrolytes in a Battery Cell

Experiments were carried out in full cells according to the above description in Example 3 using the Reference Electrolyte and Electrolytes 1, 2 or 3. The Reference Electrolyte and the Electrolytes 1, 2 and 3 each had a concentration of 0.6 mol/l of conducting salt. Four full cells were filled with the electrolytes. The full cells were charged with 50 mA up to a potential of 3.6 V. The potential of 3.6 volts was maintained until the current dropped to 40 mA.

Figure 7:
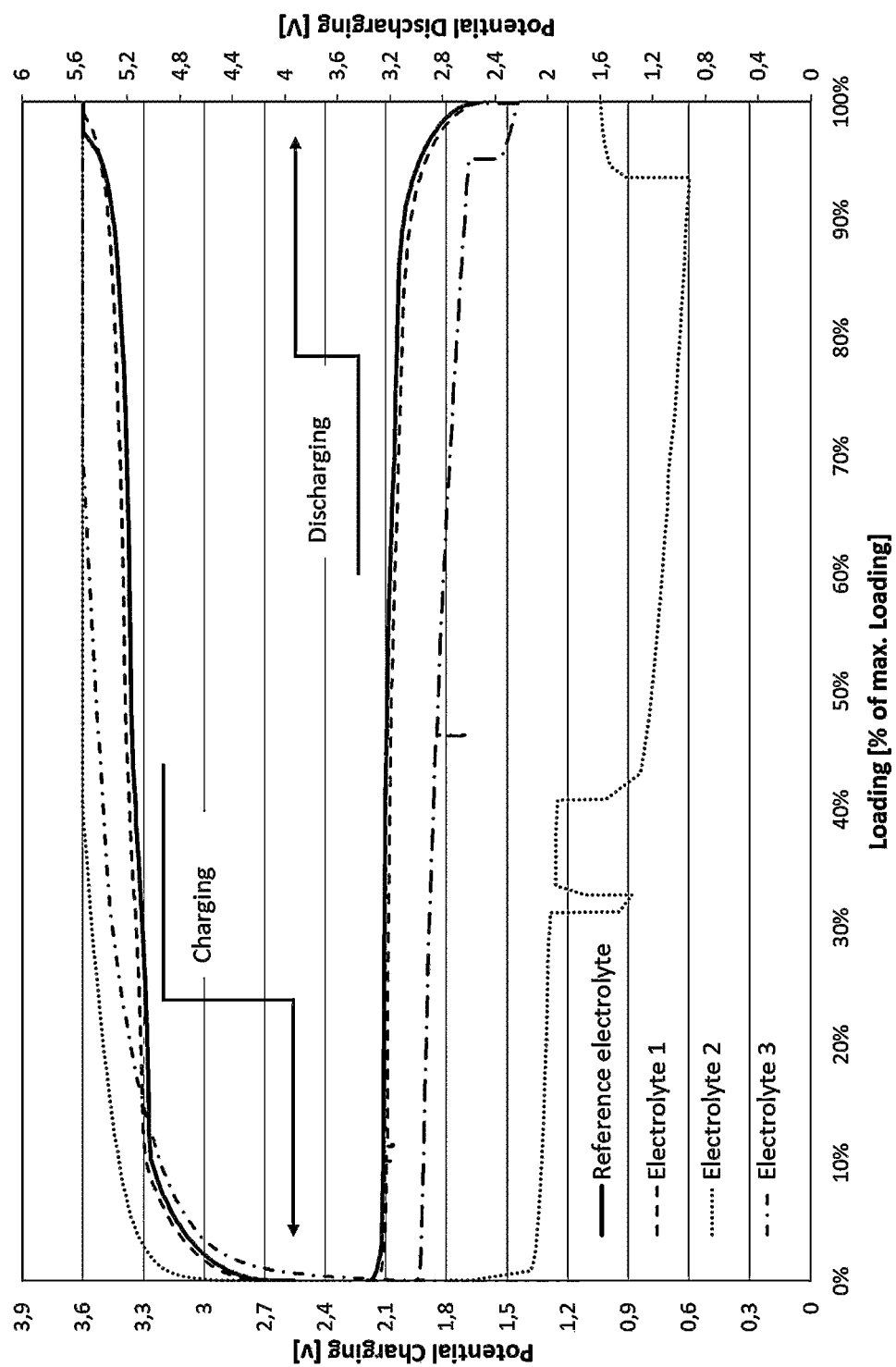
FIG. 7 shows charging and discharging potential curves in volts [V] as a function of the percentage charge of full cells filled with Electrolytes 1, 2 and 3 (prepared according to Example 2) or the Reference Electrolyte.

The discharge was performed with a current of 50 mA to a potential of 2.5 V. In the upper part, FIG. 7 shows the charging curves with reference to the scale of the left y-axis. In the lower part, it shows the discharging curves with reference to the scale of the right y-axis. With Electrolytes 1, 2 and 3 the full cells could be charged and discharged again.

Experiment 3: Verification of High Voltage Capability of Electrolytes 1, 2 and 3

To demonstrate the high voltage capability of Electrolytes 1, 2 and 3, an experiment was carried out in full cells according to Example 3. The full cell was filled with Electrolyte 1 as described in Example 2, which contained Compound 1 as the Formula (I) conducting salt in a concentration of 1 mol/l, based on 1 liter of the electrolyte.

Figure 8:
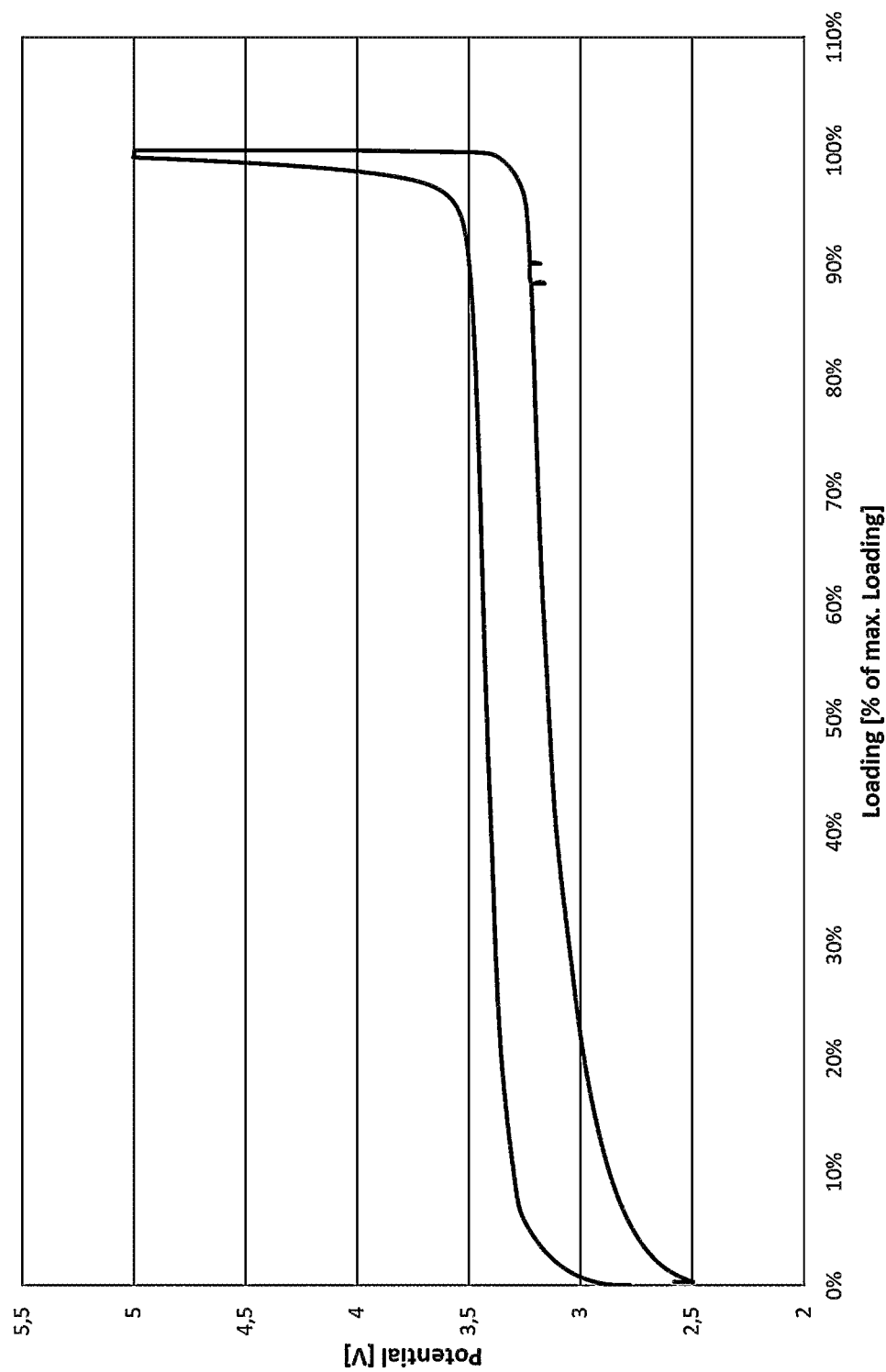
FIG. 8 shows a potential curve in volts [V] as a function of the percentage charge of a full cell filled with Electrolyte 1.

FIG. 8 shows the potential curve of the previously described full cell in volts [V] above the percentage charge in relation to the maximum charge of the full cell. The full cell was charged with an amperage of 50 mA up to a potential of 5 V. The potential was maintained until the charging current dropped to 40 mA. Afterwards the discharge took place with an amperage of 50 mA to a discharge potential of 2.5 V. FIG. 8 shows the charge/discharge curve of the full cell obtained in this experiment 3. Cycling efficiency was greater than 99.5%. This means that no capacity was used for secondary or overcharging reactions of the electrolyte. Electrolyte 1 is stable in this potential range. From this it can be concluded that the electrolyte which contains the Compound 1 conducting salt can also be used for high-energy cells in which high cell voltages occur, without the Compound 1 conducting salt decomposing.

Experiment 4: Cycling Efficiency

The charge/discharge Experiment 3 was repeated, with the difference that the upper potential limit for charging was increased from 3.6 volts to 5.0 volts in 0.2-volt steps. This means that eight cycles were performed. Table 2 shows the cycling efficiencies achieved in each case.

TABLE 2

Cycling Efficiency as a Function of Charge Potential

| Charging Potential | Cycling Efficiency |
|---|---|
| 3.60 | 99.7% |
| 3.80 | 99.6% |
| 4.00 | 99.7% |
| 4.20 | 99.7% |
| 4.40 | 99.7% |
| 4.60 | 99.7% |
| 4.80 | 99.7% |
| 5.00 | 99.7% |

The achieved cycling efficiencies are identical for each charging potential and show a stable behavior of Electrolyte 1 in the entire potential range up to 5.0 volts.

Figure 9:
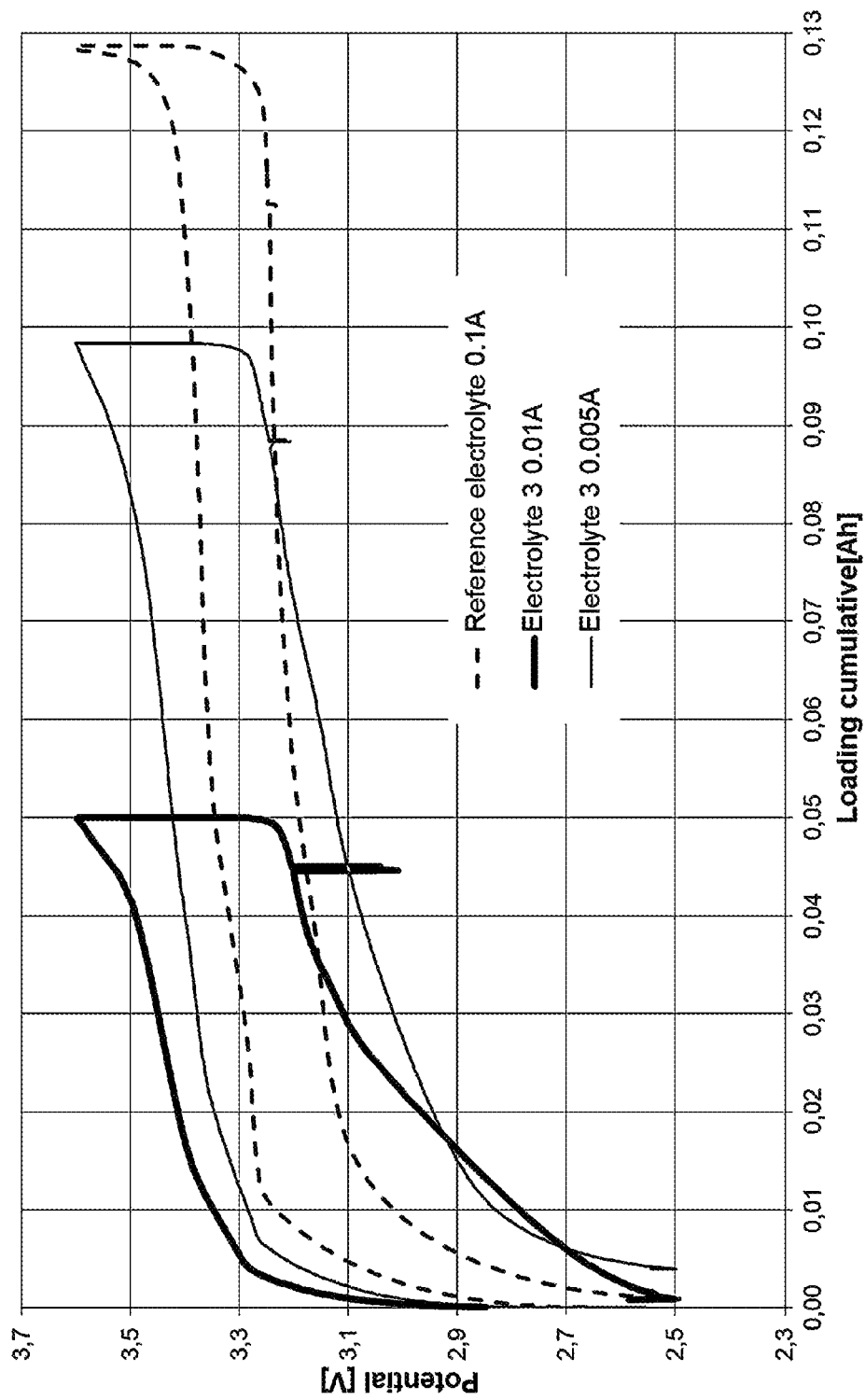
FIG. 9 shows potential curves in volts [V] as a function of the accumulated charge depending on the charge/discharge current of full cells filled with Electrolyte 3.

Experiment 5: Comparison of Electrolyte 3 to a Reference Electrolyte in a Cycling Experiment Electrolyte 3 was compared with the Reference Electrolyte in a cycling experiment. Three full cells, as described in Example 3, were used for this purpose; one full cell was filled with the Reference Electrolyte and two full cells with Electrolyte 3. The full cell was charged up to a potential of 3.6 volts and discharged to a potential 2.5 volts. The full cell with the Reference Electrolyte was operated with a current of 100 mA, the two full cells with Electrolyte 3, adapted to the lower conductivity, were charged or discharged once with 10 mA and once with 5 mA respectively. FIG. 9 shows the charge/discharge curves obtained. All full cells show a stable charge and a stable discharge. At lower currents, the attainable capacity for Electrolyte 3 increases.

Experiment 6: Comparison of Discharge Capacities and Internal Resistance of Full Cells with the Reference Electrolyte or Electrolyte 1

In this experiment, the use of the Electrolyte 1 as an alternative to the Reference Electrolyte was investigated.

This experiment was also carried out with the full cells described in Example 3. The full cells were filled either with Reference Electrolyte (hereinafter referred to as the reference full cell) or with Electrolyte 1 (hereinafter referred to as the test full cell). Thus, the reference full cell and the test full cell differed only in the type of electrolyte used.

Several cycling experiments were performed, starting with a formation cycle. Table 3 shows the charging and discharging currents used and the final charging and discharging voltages during charging and discharging of the two full cells. In addition, the limit of the charge current ($I_{cutoff}$) at the final charge voltage is 3.6 volts. There was a break of ten minutes between charging and discharging the two full cells.

TABLE 3

Data of the Cycling Experiments

| Formation: Charge/ Discharge | 1 cycle: 15 mA to 125 mAh/ 15 mA to 2.5 V |
|---|---|
| Cycling: Charge/ Discharge | 90 cycles: 50 mA to 3.6 V ($I_{cutoff}$ = 40 mA)/ 50 mA to 2.5 V |
| 24 h Rest | 1 cycle: 50 mA to 3.6 V ($I_{cutoff}$ = 40 mA)/ 24 h Rest/50 mA to 2.5 V |
| Cycling: Charge/ Discharge | 410 cycles: 50 mA to 3.6 V ($I_{cutoff}$ = 40 mA)/ 50 mA to 2.5 V |

Figure 10:
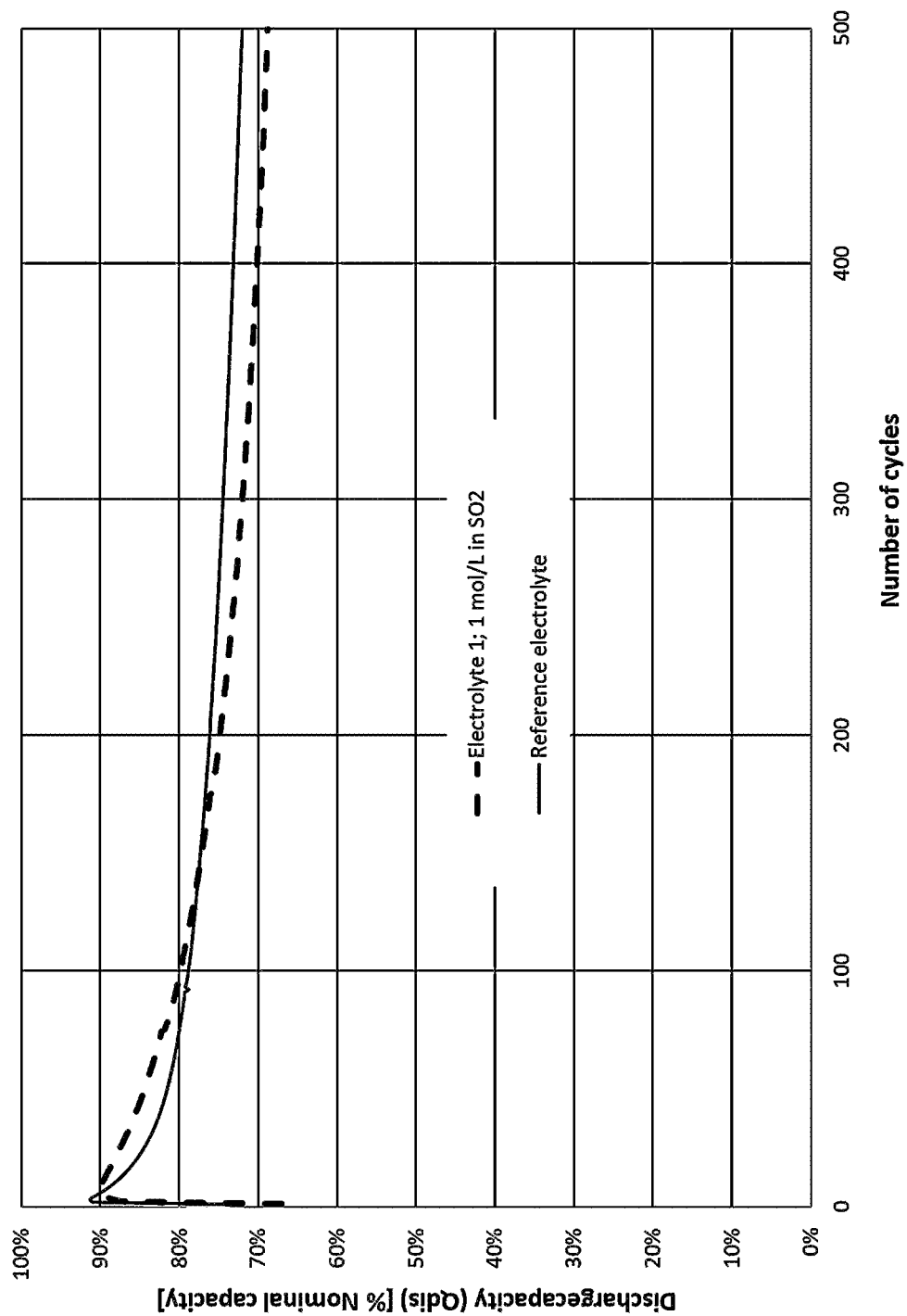
FIG. 10 shows mean values for the discharge capacities, as a function of the cycle number, of a reference full cell filled with the Reference Electrolyte and a test full cell filled with Electrolyte 1.

FIG. 10 shows mean values for the discharge capacities of the two full cells as a function of the number of cycles. The dashed line shows the average values obtained for discharging capacities of the test full cell. For this purpose, mean values obtained from three identical measurements were used. The solid line shows the discharging capacities of the reference full cell. For this purpose, mean values obtained from two identical measurements were used.

These average discharge capacity values are expressed as a percentage of the nominal capacity. The nominal capacity is obtained by subtracting from the theoretical capacity of the positive electrode the capacity consumed in the first cycle to form a coating on the negative electrode. This top layer is formed on the negative electrode when the full cell is charged for the first time. Lithium ions are irreversibly consumed for this coating formation, so that the respective full cell has less cycling capacity available for the subsequent cycles.

The starting value of the discharge capacity of both full cells is approx. 90% of the nominal capacity. Both full cells show a discharge capacity drop across the number of cycles. The capacity drop for the reference full cell was 19% up to the 500th cycle and the remaining capacity was 71%. The test full cell had a discharge capacity drop of 22% and a remaining capacity of 68% after 500 cycles. Capacity progression in both curves is almost parallel from the 300th cycle onwards and suggests further steady progression. The behavior of the full cells is similar and shows that the electrolyte according to this disclosure can be used as an alternative to the Reference Electrolyte.

Figure 11:
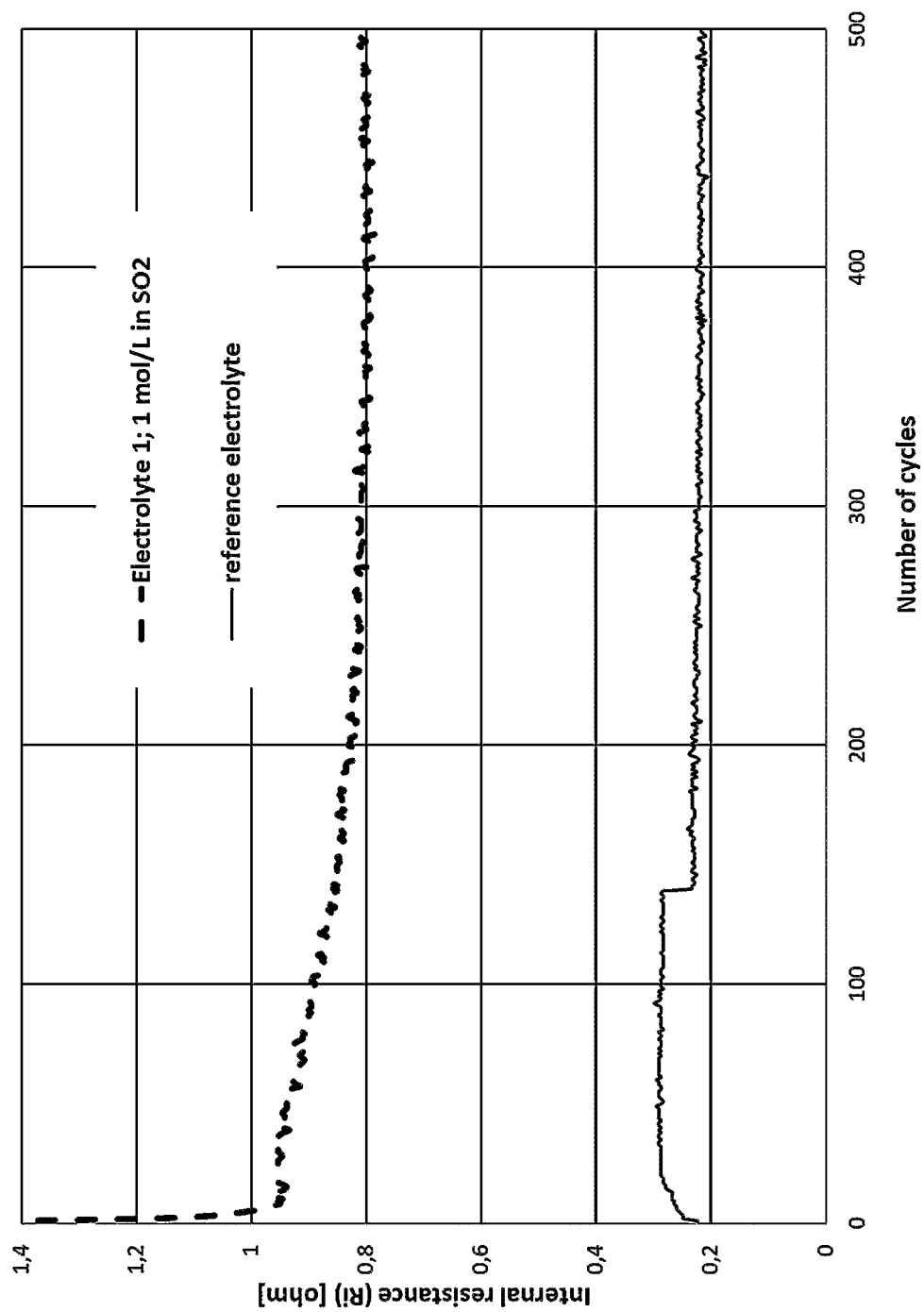
FIG. 11 shows the course of the internal resistance of the two full cells in FIG. 10 across the cycle number.

During Experiment 6, progression of the internal resistance of the two full cells was also recorded via the cycle number. FIG. 11 shows the results for the reference full cell and for the test full cell. The internal resistance is a loss factor inside the full cell due to its design. The internal resistance of the reference full cell is slightly above 0.2 Ohm. The test full cell shows a higher internal resistance of initially approx. 0.95 Ohm, which is stable at a value of 0.8 Ohm from approx. cycle 200 onwards.

These results are in line with expected values because, as discussed above, the lithium ionic conductivity in an electrolyte with the large anions of the Formula (I) conducting salts is somewhat more difficult.

Experiment 7: Determining Conductivities

The conductivity was determined by preparing the Electrolyte 1 with different concentrations of Compound 1. For each concentration of Compound 1, the conductivity of Electrolyte 1 was determined using a conductive measurement method. After temperature control, a two-electrode sensor was held in contact with the solution and measurement was carried out in a range of 0-50 mS/cm. Table 4 shows the different concentrations, the corresponding $SO_2$ contents and the conductivity values determined.

TABLE 4

Conductivity as a Function of the Concentration of Compound 1 in the Electrolyte 1

| c of Compound 1 in mol/L | wt % $SO_2$ | Conductivity in mS/cm |
| --- | --- | --- |
| 1.00 | 34% | 13.6 |
| 0.60 | 60% | 24.7 |
| 0.40 | 75% | 20.8 |
| 0.20 | 87% | 11.7 |

Figure 12:
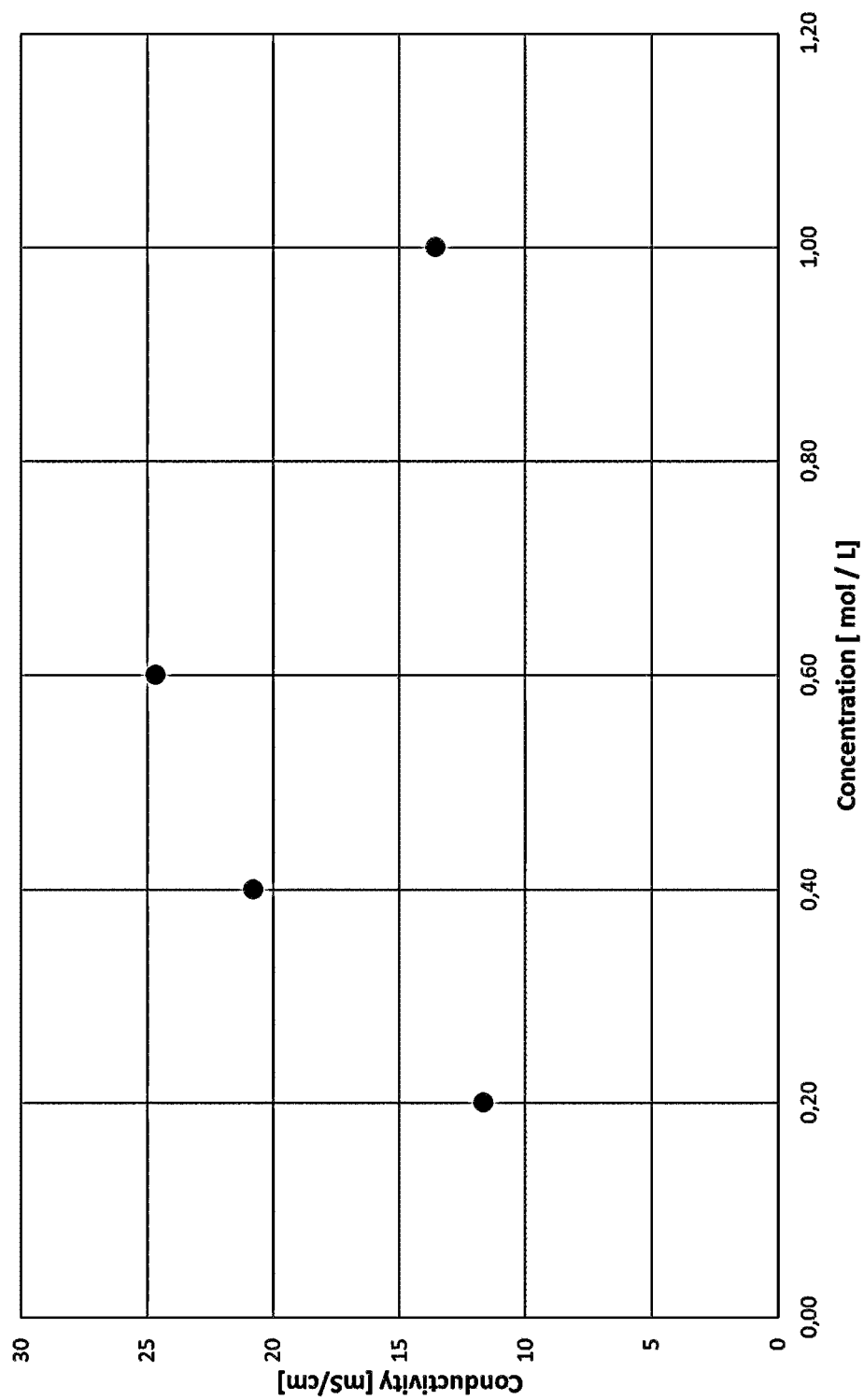
FIG. 12 shows the conductivity depending on the concentration in [mS/cm] of Electrolyte 1.

FIG. 12 shows the conductivity of Electrolyte 1 as a function of the concentration of Compound 1. A maximum conductivity of 24.7 mS/cm is depicted at a concentration of Compound 1 of 0.6 mol/L. In comparison, state-of-the-art organic electrolytes such as LP30 (1 M LiPF6/EC-DMC (1:1 weight)) have a conductivity of only approx. 10 mS/cm.

Experiment 8: Determination of a Capacitance Consumed for the Formation of a Surface Layer on the Negative Electrode In this experiment, the capacitance consumed in the first cycle for the formation of a surface layer on the negative electrode was investigated. This surface layer or cover layer is formed on the negative electrode when the full cell is charged for the first time. Lithium ions are irreversibly consumed for this coating formation, so that the full cell has less cycling capacity available for the subsequent cycles.

For this experiment, the Reference Electrolyte, Electrolytes 1 and Electrolyte 3 were each examined in a full cell having the design described in Example 3. The composition of the Reference Electrolyte used in the full cell was $LiAlCl_4 * xSO_2$ with x>1.5.

Figure 13:
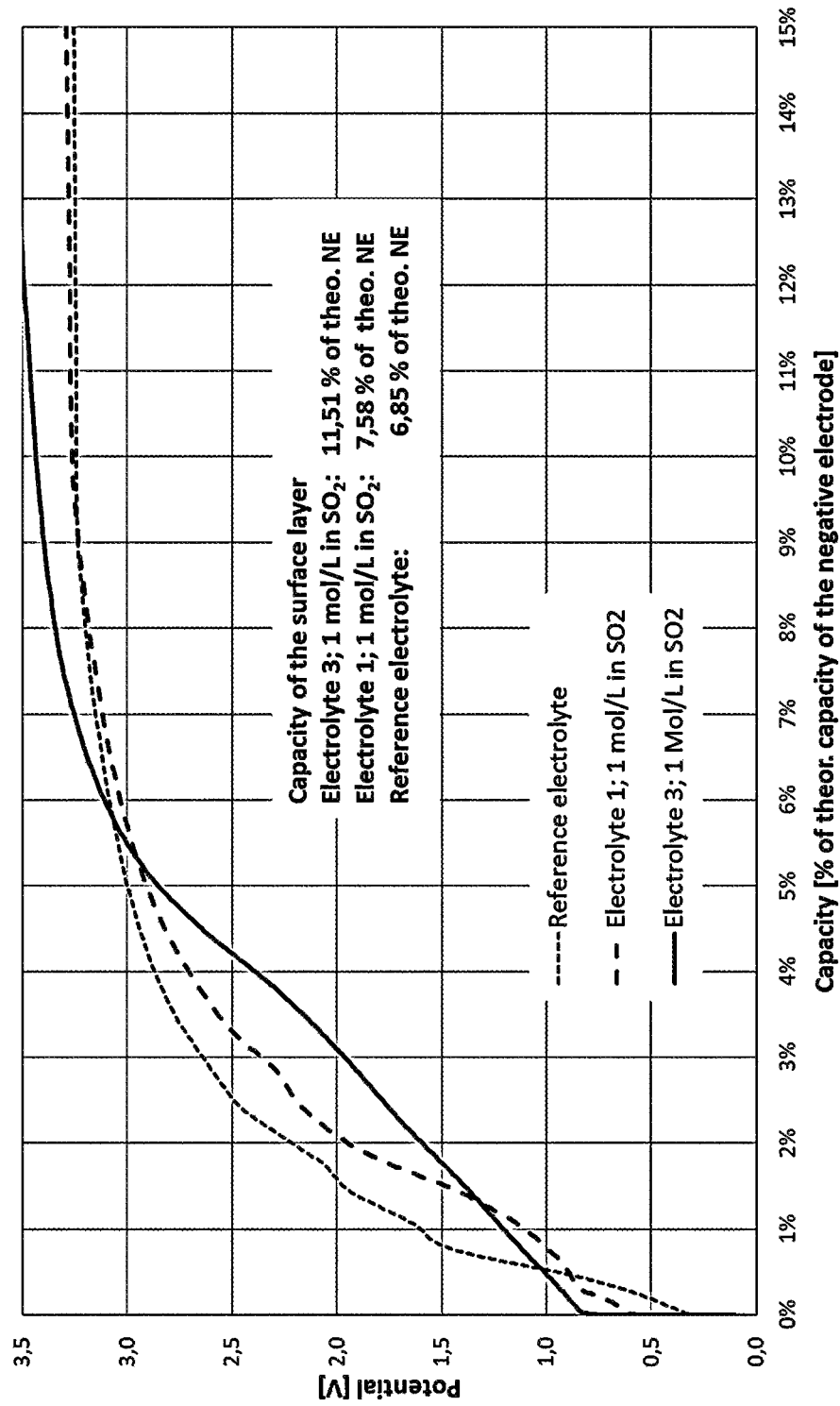
FIG. 13 shows the potential in [V] of a reference full cell and two test full cells when charging a negative electrode against lithium as a function of capacitance, which is related to the theoretical capacitance of the negative electrode, during topcoat formation on the negative electrode.

FIG. 13 shows the potential in volts of the full cells when charging the negative electrode against lithium as a function of capacity, which is related to the theoretical capacity of the negative electrode. The dotted line shows the results for the Reference Electrolyte and the dotted or solid line shows the results for the Electrolytes 1 and 3. The three curves show averaged results of several experiments with the full cells described above. First the full cells were charged with a current of 15 mA until a capacitance of 125 mAh ($Q_{cha}$) was reached. The full cells were then discharged at 15 mA until a potential of 2.5 volts was reached. This is when the discharging capacity ($Q_{dis}$) was determined.

The capacitance in % of the theory used to form the cover layer on the negative electrode is calculated according to the following formula:

$$\text{Cover layer capacity} = (Q_{cha}(125 \text{ mAh}) - Q_{dis}(x \text{ mAh}))/Q_{NEL}$$

$Q_{NEL}$ is the theoretical capacitance of the negative electrode used. In the case of graphite, the theoretical capacitance calculated is 372 mAh/g. The absolute capacity losses are 7.58% and 11.51% respectively for Electrolytes 1 and 3 and 6.85% for the Reference Electrolyte. The capacity for the formation of the surface layer is slightly higher for both Electrolytes 1 and 3 than for the Reference Electrolyte. Values in the range of 7.5%-11.5% for absolute capacity losses are good results in combination with the possibility of using high-voltage cathodes of up to 5 volts.

Experiment 9: Low-Temperature Behavior of the Reference Electrolyte and Electrolyte 1

In order to determine the low-temperature behavior of an electrolyte according to this disclosure in comparison to the Reference Electrolyte, two full cells, as described in experiment 1, were filled with Reference Electrolyte on the one hand and Electrolyte 1 on the other hand.

Both full cells were charged at 20° C. and discharged again. The discharge capacity achieved was rated 100%. In temperature steps of 10° C., the temperature of the full cells was lowered, and a charge/discharge cycle was carried out again. The discharge capacity obtained was described in % of the discharge capacity at 20° C. Table 5 shows the results.

TABLE 5

Discharge Capacities as a Function of Temperature

| Temperature | Discharge Capacity of Electrolyte 1 | Discharge Capacity of Reference Electrolyte |
| --- | --- | --- |
| 20° C. | 100% | 100% |
| 10° C. | 87% | 99% |
| 0° C. | 72% | 46% |
| −10° C. | 61% | 21% |
| −20° C. | 31% | n/a |
| −30° C. | 3% | n/a |
| −40° C. | 0% | n/a |

The full cell with Electrolyte 1 shows an excellent low-temperature behavior. At −10° C., 61% of the capacity is reached. At −20° C. the capacity reached is still 31%. Even at −30° C., a small amount can still be discharged. In contrast, the full cell with the Reference Electrolyte shows a discharge capacity of only 21% at −10° C., and no capacity is available at −20° C.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. An $SO_2$-based electrolyte for a rechargeable battery cell comprising at least one conducting salt of the Formula (I),

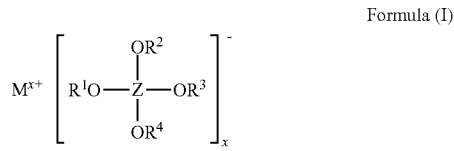

Formula (I)

wherein
M is a metal selected from the group consisting of alkali metals, alkaline earth metals, metals of group 12 of the periodic table of the elements and aluminum;
x is an integer from 1 to 3;
the substituents $R^1$, $R^2$, $R^3$ and $R^4$ are each independently selected from the group consisting of substituted or unsubstituted $C_1$-$C_{10}$ alkyl, $C_2$-$C_{10}$ alkenyl, $C_2$-$C_{10}$ alkynyl, $C_3$-$C_{10}$ cycloalkyl, $C_6$-$C_{14}$ aryl, and $C_5$-$C_{14}$ heteroaryl; and
Z is aluminum or boron.

2. The $SO_2$-based electrolyte according to claim 1, wherein $R^1$, $R^2$, $R^3$ and $R^4$ are each independently selected from the group consisting of substituted and unsubstituted: $C_1$-$C_6$ alkyl; $C_2$-$C_6$ alkenyl; $C_2$-$C_6$ alkynyl; phenyl; and $C_5$-$C_7$ heteroaryl.

3. The $SO_2$-based electrolyte according to claim 1, wherein $R^1$, $R^2$, $R^3$ and $R^4$ are each independently selected from the group consisting of substituted and unsubstituted: $C_2$-$C_4$ alkyl; $C_2$-$C_4$ alkenyl; $C_2$-$C_4$ alkynyl; $C_3$-$C_6$ cycloalkyl; phenyl; and $C_5$-$C_7$ heteroaryl.

4. The $SO_2$-based electrolyte according to claim 1, wherein $R^1$, $R^2$, $R^3$ and $R^4$ are independently selected from the group consisting of substituted and unsubstituted: 2-propyl, methyl and ethyl; ethenyl and propenyl; $C_2$-$C_4$ alkynyl; $C_3$-$C_6$ cycloalkyl; phenyl; and $C_5$-$C_7$ heteroaryl.

5. The $SO_2$-based electrolyte according to claim 1, wherein one, two, three or all four of $R^1$, $R^2$, $R^3$ and $R^4$ comprise a substituent independently selected from the group consisting of: at least one fluorine atom; at least one group that comprises at least one fluorine atom; at least one chemical group that is a $C_1$-$C_4$ alkyl, $C_2$-$C_4$ alkenyl, $C_2$-$C_4$ alkynyl, phenyl or benzyl.

6. The $SO_2$-based electrolyte according to claim 1, wherein one, two, three or all four of $R^1$, $R^2$, $R^3$ and $R^4$ comprises at least one substituent independently selected from a $CF_3$ group and an $OSO_2CF_3$ group.

7. The $SO_2$-based electrolyte according to claim 1, wherein one, two, three or all four of $R^1$, $R^2$, $R^3$ and $R^4$ comprises at least two substituents independently selected from a $CF_3$ group and an $OSO_2CF_3$ group.

8. The $SO_2$-based electrolyte according to claim 1, wherein one, two, three or all four of $R^1$, $R^2$, $R^3$ and $R^4$ comprises at least three substituents independently selected from a $CF_3$ group and an $OSO_2CF_3$ group.

9. The $SO_2$-based electrolyte according to claim 1, wherein the Formula (I) conducting salt comprises a conducting salt selected from the group consisting of

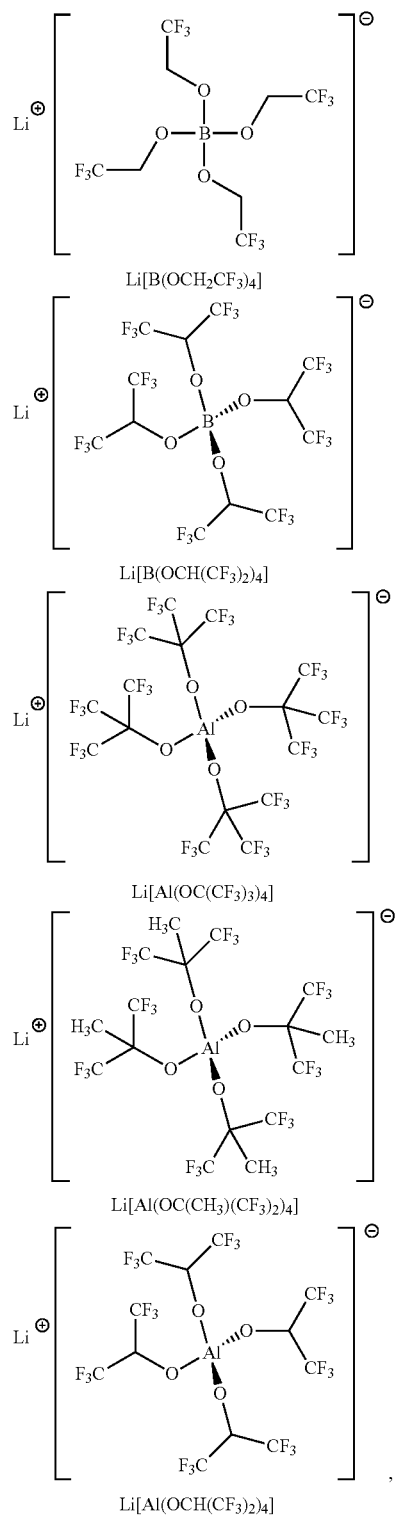

and combinations thereof.

10. The $SO_2$-based electrolyte according to claim 1, further comprising at least one conducting salt that does not have a structure of Formula (I).

11. The $SO_2$-based electrolyte according to claim 10, further comprising at least one conducting salt that comprises an alkali metal compound.

12. The SO$_2$-based electrolyte according to claim 11, wherein the alkali metal is lithium.

13. The SO$_2$-based electrolyte according to claim 12, wherein the lithium compound is selected from the group consisting of an aluminate, a halide, an oxalate, a borate, a phosphate, an arsenate and a gallate.

14. The SO$_2$-based electrolyte according to claim 13, wherein the lithium compound is a lithium tetrahalogenoaluminate, and optionally lithium tetrachloroaluminate.

15. The SO$_2$-based electrolyte according to claim 1, further comprising at least one additive that is not a conductive salt.

16. The SO$_2$-based electrolyte according to claim 15, wherein the at least one additive is selected from the group consisting of vinylene carbonate and its derivatives, vinyl ethylene carbonate and its derivatives, methyl ethylene carbonate and its derivatives, lithium (bisoxalato)borate, lithium difluoro(oxalato)borate, lithium tetrafluoro(oxalato) phosphate, lithium oxalate, 2-vinylpyridine, 4-vinylpyridine, cyclic exomethylenecarbonates, sultones, cyclic and acyclic sulfonates, acyclic sulfites, cyclic and acyclic sulfinates, organic esters, inorganic acids, acyclic and cyclic alkanes, wherein said acyclic and cyclic alkanes have a boiling point at 1 bar of at least 36° C., aromatic compounds, halogenated cyclic and acyclic sulfonylimides, halogenated cyclic and acyclic phosphate esters, halogenated cyclic and acyclic phosphines, halogenated cyclic and acyclic phosphites, halogenated cyclic and acyclic phosphazenes, halogenated cyclic and acyclic silylamines, halogenated cyclic and acyclic halogenated esters, halogenated cyclic and acyclic amides, halogenated cyclic and acyclic anhydrides, halogenated organic heterocycles, and combinations thereof.

17. The SO$_2$-based electrolyte according to claim 1, wherein the electrolyte comprises, based on the total weight of the electrolyte composition:
(i) 5 to 99.4% by weight of sulfur dioxide;
(ii) 0.6 to 95% by weight of Formula (I) conducting salts;
(iii) 0 to 25% by weight of conducting salts having a structure not of Formula (I); and
(iv) 0 to 10% by weight of one or more additives that are not conducting salts.

18. The SO$_2$-based electrolyte according to claim 1, wherein the electrolyte comprises, based on the total weight of the electrolyte composition:
(i) 5 to 99.4% by weight of sulfur dioxide,
(ii) 0.6 to 95% by weight of Formula (I) conducting salts,
(iii) up to 25% by weight of conducting salts having a structure not of Formula (I); and
(iv) up to 10% by weight of one or more additives that are not conducting salts.

19. The SO$_2$-based electrolyte according to claim 1, wherein the cumulative molar concentration of all Formula (I) conducting salts in the electrolyte, relative to the total volume of the SO$_2$-based electrolyte, is in a range of 0.05 mol/1 to 10 mol.

20. The SO$_2$-based electrolyte according to claim 1, wherein, relative to the number of moles of conducting salts present in the electrolyte, the SO$_2$ is present in the electrolyte in an amount of at least 0.1 mol SO$_2$ per mol of conducting salt.

21. The SO$_2$-based electrolyte according to claim 1, wherein, relative to the number of moles of conducting salts present in the electrolyte, the SO$_2$ is present in the electrolyte in an amount selected from the group consisting of 0.1-2.5 mol SO$_2$, 2.5-5.0 mol SO$_2$, 5.0-7.5 mol SO$_2$, 7.5-10 mol SO$_2$, 10-15 mol SO$_2$, 15-20 mol SO$_2$, 15-25 mol SO$_2$, 20-25 mol SO$_2$, 25-50 mol SO$_2$, 50-75 mol SO$_2$, 75-100 mol SO$_2$, 100-500 mol SO$_2$, 500-1000 mol SO$_2$, 1000-1500 mol SO$_2$, 1500-2000 mol SO$_2$, and 2000-2600 mol SO$_2$ per mol of conducting salt.

22. The SO$_2$-based electrolyte according to claim 1, wherein the electrolyte is substantially resistant to oxidation at a cell voltage of up to 4.0 volts.

23. A rechargeable battery cell comprising the SO$_2$-based electrolyte according to claim 1.

24. The rechargeable battery cell according to claim 23, wherein the rechargeable battery cell comprises an active metal, at least one positive electrode, at least one negative electrode, and a housing.

25. The rechargeable battery cell according to claim 23, wherein the active metal is selected from the group consisting of an alkali metal, an alkaline earth metal, a metal of group 12 of the periodic table of the elements, and aluminum.

26. The rechargeable battery cell according to claim 23, wherein the active metal is selected from the group consisting of lithium, sodium, calcium, zinc, and aluminum.

27. The rechargeable battery cell according to claim 23, wherein the negative electrode is an insertion electrode.

28. The rechargeable battery cell according to claim 27, wherein the negative electrode contains carbon as an active material.

29. The rechargeable battery cell according to claim 28, wherein the carbon is in the form of graphite.

30. The rechargeable battery cell according to claim 23, wherein the positive electrode contains as active material at least one intercalation compound.

31. The rechargeable battery cell according to claim 30, wherein the at least one intercalation compound comprises the composition
$Li_xM'_yM''_zO_a$ wherein
M' is at least one metal chosen from the group consisting of the elements Ti, V, Cr, Mn, Fe, Co, Ni, Cu and Zn;
M" is at least one element chosen from the group formed by the elements of the groups 2, 3, 4, 5, 6, 7, 8, 9, 10, 11, 12, 13, 14, 15 and 16 of the periodic table of the elements,
x and y are greater than 0,
z is greater than or equal to 0 and
a is greater than O.

32. The rechargeable battery cell according to claim 31, wherein M' is iron and M" is phosphorus.

33. The rechargeable battery cell according to claim 32, wherein x, y and z are equal to 1 and a is equal to 4.

34. The rechargeable battery cell according to claim 31, wherein M' is manganese and M" is cobalt.

35. The rechargeable battery cell according to claim 34, wherein x, y and z are equal to 1 and a is equal to 4.

36. The rechargeable battery cell according to claim 31, wherein M' comprises nickel and manganese and M" is cobalt.

37. The rechargeable battery cell according to claim 23, wherein the positive electrode comprises at least one metal compound selected from the group consisting of a metal oxide, a metal halide and a metal phosphate, and wherein the metal of the metal compound is preferably a transition metal with an atomic number of 22 to 28 of the periodic table of elements.

38. The rechargeable battery cell according to claim 37, wherein the metal of the metal compound is selected from the group consisting of cobalt, nickel, manganese and iron.

39. The rechargeable battery cell according to claim 23, wherein at least one positive electrode, at least one negative electrode, or at least one positive electrode and at least one negative electrode comprise a conducting element that is selected from the group consisting of a planar-shaped metal sheet, a planar-shaped metal foil, and a three-dimensionally-shaped porous metal structure.

40. The rechargeable battery cell according to claim 39, wherein the three-dimensionally-shaped porous metal structure is a metal foam.

41. The rechargeable battery cell according to claim 23, wherein at least one positive electrode, at least one negative electrode, or at least one positive electrode and at least one negative electrode comprise at least one binder.

42. The rechargeable battery cell according to claim 41, wherein the binder is selected from the group consisting of a fluorinated binder, a fluorinated binder comprising polyvinylidene fluoride, a fluorinated binder comprising a terpolymer comprising tetrafluoroethylene, hexafluoropropylene and vinylidene fluoride, a binder comprising a polymer comprising monomeric structural units of a conjugated carboxylic acid, a binder comprising a polymer comprising monomeric structural units of an alkali metal, alkaline earth metal or ammonium salt of a conjugated carboxylic acid, a binder comprising a polymer based on monomeric styrene and butadiene structural units, a binder comprising a carboxymethylcelluloses, and combinations of two or more of the foregoing binders.

43. The rechargeable battery cell according to claim 42, wherein the binder is present in a maximum concentration by the total weight of the electrode selected from the group consisting of not greater than 30% by weight, not greater than 20% by weight, not greater than 15% by weight, not greater than 10% by weight, not greater than 7% by weight, not greater than 5% by weight, and not greater than 2% by weight.

44. The rechargeable battery cell according to claim 23, wherein the rechargeable battery cell comprises a plurality of negative electrodes and a plurality of positive electrodes, and wherein the negative and positive electrodes are arranged alternately stacked in the housing.

45. The rechargeable battery cell according to claim 44, wherein the negative and positive electrodes are electrically separated from each other by separators.

46. The $SO_2$-based electrolyte according to claim 19, wherein the cumulative molar concentration of all Formula (I) conducting salts in the electrolyte, relative to the total volume of the $SO_2$-based electrolyte, is in a range of 0.1 mol/l to 6 mol/l.

47. The $SO_2$-based electrolyte according to claim 19, wherein the cumulative molar concentration of all Formula (I) conducting salts in the electrolyte, relative to the total volume of the $SO_2$-based electrolyte, is in a range of 0.2 mol/l to 5 mol/l.

48. The $SO_2$-based electrolyte according to claim 19, wherein the cumulative molar concentration of all Formula (I) conducting salts in the electrolyte, relative to the total volume of the $SO_2$-based electrolyte, is in a range of 0.5 mol/l to 4 mol/l.

49. The $SO_2$-based electrolyte according to claim 19, wherein the cumulative molar concentration of all Formula (I) conducting salts in the electrolyte, relative to the total volume of the $SO_2$-based electrolyte, is in a range of 0.2 mol/l to 3.5 mol/l.

50. The $SO_2$-based electrolyte according to claim 1, wherein, relative to the number of moles of conducting salts present in the electrolyte, the $SO_2$ is present in the electrolyte in an amount of at least at least 1 mol $SO_2$ per mol of conducting salt.

51. The $SO_2$-based electrolyte according to claim 1, wherein, relative to the number of moles of conducting salts present in the electrolyte, the $SO_2$ is present in the electrolyte in an amount of at least at least 5 mol $SO_2$ per mol of conducting salt.

52. The $SO_2$-based electrolyte according to claim 1, wherein, relative to the number of moles of conducting salts present in the electrolyte, the $SO_2$ is present in the electrolyte in an amount of at least 10 mol $SO_2$ per mol of conducting salt.

53. The $SO_2$-based electrolyte according to claim 1, wherein, relative to the number of moles of conducting salts present in the electrolyte, the $SO_2$ is present in the electrolyte in an amount of at least 20 mol $SO_2$ per mol of conducting salt.

54. The $SO_2$-based electrolyte according to claim 1, wherein the electrolyte is substantially resistant to oxidation at a cell voltage up to 4.2 volts.

55. The $SO_2$-based electrolyte according to claim 1, wherein the electrolyte is substantially resistant to oxidation at a cell voltage up to 4.4 volts.

56. The $SO_2$-based electrolyte according to claim 1, wherein the electrolyte is substantially resistant to oxidation at a cell voltage up to 4.6 volts.

57. The $SO_2$-based electrolyte according to claim 1, wherein the electrolyte is substantially resistant to oxidation at a cell voltage up to 4.8 volts.

58. The $SO_2$-based electrolyte according to claim 1, wherein the electrolyte is substantially resistant to oxidation at a cell voltage up to 5.0 volts.

* * * * *